US012483505B2

(12) United States Patent
Mathew et al.

(10) Patent No.: US 12,483,505 B2
(45) Date of Patent: Nov. 25, 2025

(54) BRINGING NUMA AWARENESS TO LOAD BALANCING IN OVERLAY NETWORKS

(71) Applicant: VMware LLC, Palo Alto, CA (US)

(72) Inventors: Subin Cyriac Mathew, San Jose, CA (US); Chidambareswaran Raman, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 21 days.

(21) Appl. No.: 18/378,744

(22) Filed: Oct. 11, 2023

(65) Prior Publication Data
US 2025/0126062 A1 Apr. 17, 2025

(51) Int. Cl.
*H04L 45/745* (2022.01)
*H04L 45/76* (2022.01)
*H04L 47/125* (2022.01)

(52) U.S. Cl.
CPC ............ *H04L 45/745* (2013.01); *H04L 45/76* (2022.05); *H04L 47/125* (2013.01)

(58) Field of Classification Search
None
See application file for complete search history.

(56) References Cited

U.S. PATENT DOCUMENTS

| 10,719,341 | B2 | 7/2020 | Shen et al. | |
|---|---|---|---|---|
| 11,743,191 | B1* | 8/2023 | Mathew | H04L 47/125 709/238 |
| 2019/0068496 | A1* | 2/2019 | Tessmer | H04L 12/413 |
| 2019/0297013 | A1* | 9/2019 | Xin | H04L 45/74 |
| 2021/0400029 | A1* | 12/2021 | Wang | H04L 63/0485 |
| 2022/0334864 | A1* | 10/2022 | K N | G06F 8/61 |
| 2022/0353180 | A1* | 11/2022 | Mathew | H04L 45/64 |
| 2023/0161631 | A1* | 5/2023 | Sharma | G06F 9/4856 718/104 |
| 2024/0028366 | A1* | 1/2024 | Mathew | H04L 69/22 |
| 2024/0028367 | A1* | 1/2024 | Mathew | G06F 9/45558 |
| 2024/0031291 | A1* | 1/2024 | Mathew | H04L 12/4633 |
| 2024/0251010 | A1* | 7/2024 | Chen | G06F 9/45558 |

FOREIGN PATENT DOCUMENTS

EP 4075757 A1 10/2022

OTHER PUBLICATIONS

European Patent Office, Extended Search Report, Application No. 24204202.6, Feb. 21, 2025, 14 pages.

* cited by examiner

*Primary Examiner* — June Sison
(74) *Attorney, Agent, or Firm* — Quarles & Brady LLP

(57) ABSTRACT

Some embodiments provide a novel method for forwarding data messages between first and second host computers. To send, to a first machine executing on the first host computer, a flow from a second machine executing on the second host computer, the method identifies a destination network address of the flow. The method uses the identified destination network address to identify a particular tunnel endpoint group (TEPG) including a particular set of one or more tunnel endpoints (TEPs) associated with a particular non-uniform memory access (NUMA) node of a set of NUMA nodes of the first host computer. The particular NUMA node executes the first machine. The method selects, from the particular TEPG, a particular TEP as a destination TEP of the flow. The method sends the flow to the particular TEP of the particular NUMA node of the first host computer to send the flow to the first machine.

20 Claims, 18 Drawing Sheets

| VM MACs to TEPGs | |
|---|---|
| VM MAC | TEPG |
| 00-B0-D0-63-C1-65 | TEP1, TEP2 |
| 00-C1-D5-77-A2-98 | TEP1, TEP2 |
| 00-B0-D1-34-C2-44 | TEP3, TEP4 |
| 00-C1-D7-21-A8-31 | TEP3, TEP4 |

| VM MACs to TEPGs | |
|---|---|
| VM MAC | TEPG |
| 00-B0-D0-63-C1-65 | TEPG1 |
| 00-C1-D5-77-A2-98 | TEPG1 |
| 00-B0-D1-34-C2-44 | TEPG2 |
| 00-C1-D7-21-A8-31 | TEPG2 |

1320

| TEPGs TEPs | |
|---|---|
| TEPG | TEP |
| TEPG1 | TEP1, TEP2 |
| TEPG2 | TEP3, TEP4 |

BRINGING NUMA AWARENESS TO LOAD BALANCING IN OVERLAY NETWORKS

BACKGROUND

Modern processors have multiple non-uniform memory access (NUMA) nodes (e.g., NUMA nodes). Overlay workloads (e.g., machines, such as virtual machines (VMs)) experience network performance degradation when data message flows sent to and from a workload are sent through a physical network interface card (PNIC) not associated with the NUMA node on which the workload is running. Traditional link aggregation groups (LAGs) cannot solve this problem as they are not NUMA aware. Hence, methods and systems are required for avoiding data message transfer across NUMA nodes for overlay encapsulated traffic.

BRIEF SUMMARY

Some embodiments provide a novel method for forwarding data messages between first and second host computers. To send, to a first machine executing on the first host computer, a data message flow from a second machine executing on the second host computer, the method identifies a destination network address of the data message flow. The method uses the identified destination network address to identify a particular tunnel endpoint group (TEPG) including a particular set of one or more tunnel endpoints (TEPs) associated with a particular non-uniform memory access (NUMA) node of a set of NUMA nodes of the first host computer. The particular NUMA node executes the first machine. The method selects, from the particular TEPG, a particular TEP as a destination TEP of the data message flow. The method sends the data message flow to the particular TEP of the particular NUMA node of the first host computer to send the data message flow to the first machine.

The method is performed in some embodiments by a virtual switch (also referred to as a software switch) of the second host computer. The first and second machines are in some embodiments first and second VMs. In some embodiments, each NUMA node of the first host computer includes a local memory and a set of processors that can access data from local memories of other NUMA nodes. The sets of processors can access other NUMA nodes' memories through a processor interconnect (e.g., QuickPath Interconnect (QPI)) connecting the NUMA nodes.

Each NUMA node of the first host computer in some embodiments includes a local memory and a set of processors that can provide data messages destined to other NUMA nodes to the other NUMA nodes. In such embodiments, each NUMA node provides the data messages destined to the other NUMA nodes to the other NUMA nodes through a set of processor interconnects connecting the NUMA node to the other NUMA nodes.

In some embodiments, the virtual switch identifies the destination network address of the data message flow by examining a header of the data message flow to identify the destination network address. In some of these embodiments, the identified destination network address is a media access control (MAC) address of the first machine. In other embodiments, the identified destination network address is an Internet Protocol (IP) address of the first machine.

The virtual switch in some embodiments selects the particular TEP as the destination TEP of the data message flow by performing a load balancing operation to select the particular TEP from the particular set of TEPs of the particular TEPG. In such embodiments, the virtual switch performs this load balancing operation to distribute flows destined for the particular NUMA node (e.g., to machines, including the first machine, executing on the particular NUMA node) among the particular set of TEPs. In other embodiments, the virtual switch selects the particular TEP non-deterministically.

In some embodiments, the virtual switch sends the data message flow to the particular TEP by (1) encapsulating data messages of the data message flow with an encapsulating header that specifies a particular TEP identifier (ID) identifying the particular TEP, and (2) sending the encapsulated data messages of the data message flow to the particular TEP. By encapsulating the flow with the destination TEP ID, the flow will be sent to that destination TEP.

The virtual switch in some embodiments uses the identified destination network address to identify the particular TEPG by performing a lookup operation in a mapping table to match the identified destination network address to a particular mapping entry that specifies the identified destination network address and the particular TEPG. In such embodiments, particular mapping entry specifies the particular set of TEP IDs identifying the TEPs that are members of the particular TEPG. In other embodiments, the virtual switch performs two lookup operations respectively in two mapping tables to identify the particular set of TEP IDs. In such embodiments, the first lookup operation uses the identified destination network address to identify a TEPG ID identifying the particular TEPG. The second lookup operation uses the identified TEPG ID to identify the particular set of TEPGs. In these embodiments, the virtual switch stores separate mapping tables to match network addresses of machines to TEPGs and to match TEPGs to TEPs.

In some embodiments, the mapping table (or tables, in some embodiments) is received from a set of one or more controllers that configures the first and second host computers. In such embodiments, a virtual switch of the first host computer generates the mapping table(s) and provides the mapping table(s) to the controller set to provide to the second host computer. The controller set in some embodiments also provides the mapping table(s) to one or more other host computers to use to forward flows to the first host computer. The virtual switch of the second host computer (and, in some embodiments, one or more other virtual switches of one or more other host computers) stores the mapping table(s) in a local data store to map different machines executing on the set of NUMA nodes to the TEPs associated with the NUMA nodes such that the virtual switch knows which TEP or TEPs to use when forwarding flows to the machines.

The first host computer is in some embodiments associated with multiple TEPGs. In such embodiments, each TEPG includes a different set of TEPs that is associated with a different NUMA node of the first host computer such that each NUMA node is associated with a different TEPG. By grouping the TEPs into TEPGs based on which NUMA node with which they are associated, the virtual switch is able to select between TEPs of a single TEPG to forward a flow to a machine executing on the machine associated with that TEPG. In such embodiments, the mapping table stored and used by the virtual switch includes several mapping entries that map different machines executing on the first host computer's NUMA nodes to different TEPGs associated with the NUMA nodes. Each TEP of each TEPG is in some embodiments associated with one NUMA node. In such embodiments, no TEP is a member of two or more TEPGs.

Each NUMA node is connected in some embodiments to a different set of one or more physical network interface cards (PNICs) to connect to the second host computer. The PNICs allow for the NUMA nodes to connect to the second host computer (e.g., through one or more PNICs of the second host computer). In some embodiments, each PNIC connects to the second host computer through one or more Top-of-Rack (ToR) switches. In such embodiments, the TOR switches are intervening switches that exchange flows between the first and second host computers.

In some embodiments, each TEP of each NUMA node is associated with the set of PNICs connected to the NUMA node. More specifically, the TEPs are associated with the uplink interfaces of the PNICs. For example, a particular TEP associated with a particular NUMA node is associated with a particular uplink interface of a particular PNIC connected to the particular NUMA node. Any data messages sent to or from the particular TEP will be sent to or from the particular uplink interface of the particular PNIC.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIGS. 13A-B illustrate example mapping tables generated by a software switch of a NUMA-based server to associate machines of the NUMA-based server with TEPGs.

DETAILED DESCRIPTION

Figure 1A:
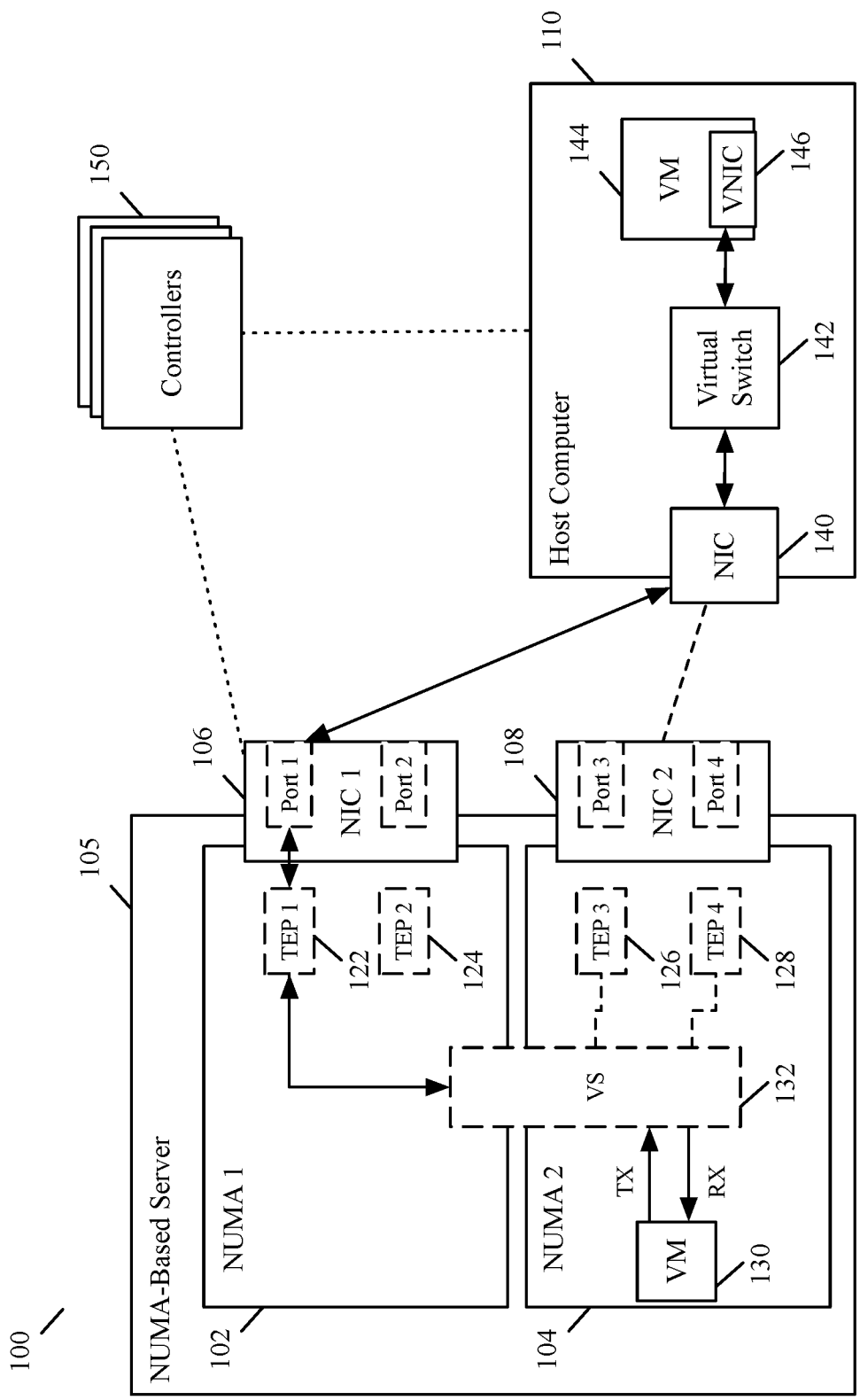
FIGS. 1A-B illustrate an example SDN including a NUMA-based server that exchanges flows with a host computer of the SDN.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for forwarding data messages between first and second host computers. To send, to a first machine executing on the first host computer, a data message flow from a second machine executing on the second host computer, the method identifies a destination network address of the data message flow. The method uses the identified destination network address to identify a particular tunnel endpoint group (TEPG) including a particular set of one or more tunnel endpoints (TEPs) associated with a particular non-uniform memory access (NUMA) node of a set of NUMA nodes of the first host computer. The particular NUMA node executes the first machine. The method selects, from the particular TEPG, a particular TEP as a destination TEP of the data message flow. The method sends the data message flow to the particular TEP of the particular NUMA node of the first host computer to send the data message flow to the first machine.

The method is performed in some embodiments by a virtual switch (also referred to as a software switch) of the second host computer. The first and second machines are in some embodiments first and second VMs. In some embodiments, each NUMA node of the first host computer includes a local memory and a set of processors that can access data from local memories of other NUMA nodes. The sets of processors can access other NUMA nodes' memories through a processor interconnect (e.g., QuickPath Interconnect (QPI)) connecting the NUMA nodes.

Each NUMA node of the first host computer in some embodiments includes a local memory and a set of processors that can provide data messages destined to other NUMA nodes to the other NUMA nodes. In such embodiments, each NUMA node provides the data messages destined to the other NUMA nodes to the other NUMA nodes through a set of processor interconnects connecting the NUMA node to the other NUMA nodes.

In some embodiments, the virtual switch identifies the destination network address of the data message flow by examining a header of the data message flow to identify the destination network address. In some of these embodiments, the identified destination network address is a media access control (MAC) address of the first machine. In other embodiments, the identified destination network address is an Internet Protocol (IP) address of the first machine.

The virtual switch in some embodiments uses the identified destination network address to identify the particular TEPG by performing a lookup operation in a mapping table to match the identified destination network address to a particular mapping entry that specifies the identified destination network address and the particular TEPG. In such embodiments, particular mapping entry specifies the particular set of TEP IDs identifying the TEPs that are members of the particular TEPG. In other embodiments, the virtual switch performs two lookup operations respectively in two mapping tables to identify the particular set of TEP IDs. In such embodiments, the first lookup operation uses the identified destination network address to identify a TEPG ID identifying the particular TEPG. The second lookup operation uses the identified TEPG ID to identify the particular set of TEPGs. In these embodiments, the virtual switch stores separate mapping tables to match network addresses of machines to TEPGs and to match TEPGs to TEPs.

The first host computer is in some embodiments associated with multiple TEPGs. In such embodiments, each TEPG includes a different set of TEPs that is associated with a different NUMA node of the first host computer such that each NUMA node is associated with a different TEPG. By grouping the TEPs into TEPGs based on which NUMA node with which they are associated, the virtual switch is able to select between TEPs of a single TEPG to forward a flow to a machine executing on the machine associated with that TEPG. In such embodiments, the mapping table stored and used by the virtual switch includes several mapping entries that map different machines executing on the first host computer's NUMA nodes to different TEPGs associated with the NUMA nodes. Each TEP of each TEPG is in some embodiments associated with one NUMA node. In such embodiments, no TEP is a member of two or more TEPGs.

Each NUMA node is connected in some embodiments to a different set of one or more physical network interface cards (PNICs) to connect to the second host computer. The PNICs allow for the NUMA nodes to connect to the second host computer (e.g., through one or more PNICs of the second host computer). In some embodiments, each PNIC connects to the second host computer through one or more Top-of-Rack (ToR) switches. In such embodiments, the TOR switches are intervening switches that exchange flows between the first and second host computers.

In some embodiments, each TEP of each NUMA node is associated with the set of PNICs connected to the NUMA node. More specifically, the TEPs are associated with the uplink interfaces of the PNICs. For example, a particular TEP associated with a particular NUMA node is associated with a particular uplink interface of a particular PNIC connected to the particular NUMA node. Any data messages sent to or from the particular TEP will be sent to or from the particular uplink interface of the particular PNIC.

Some embodiments provide a novel method for forwarding data messages between first and second host computers. To send, to a first machine executing on the first host computer, a second data message flow from a second machine executing on the second host computer that is in response to a first data message flow from the first machine, the method identifies from a set of tunnel endpoints (TEPs) of the first host computer a particular TEP that is a source TEP of the first data message flow. The method uses the particular TEP to identify one particular non-uniform memory access (NUMA) node of a set of NUMA nodes of the first host computer as the NUMA node associated with the first data message flow. The method selects, from a subset of TEPs of the first host computer that is associated with the particular NUMA node, one TEP as a destination TEP of the second data message flow. The method sends the second data message flow to the selected TEP of the first host computer.

The method is performed in some embodiments by a virtual switch (also referred to as a software switch) of the second host computer. The first and second machines are in some embodiments first and second virtual machines (VMs). In some embodiments, each NUMA node of the first host computer includes a local memory and a set of processors that can access data from local memories of other NUMA nodes. The sets of processors can access other NUMA nodes' memories through a processor interconnect (e.g., a QuickPath Interconnect (QPI)) connecting the NUMA nodes.

The encapsulating header is in some embodiments a first encapsulating header and the particular TEP ID is in some embodiments a first TEP ID. In such embodiments, the virtual switch sends the second data message flow to the selected TEP of the first host computer by encapsulating data messages of the second data message flow with a second encapsulating header specifying a second TEP ID identifying the selected TEP. By encapsulating the second flow with the second TEP ID, the second flow will be sent to the selected TEP, which is associated with the particular NUMA node.

The selected TEP to which the second flow is sent is in some embodiments the particular TEP that is the source TEP of the first data message flow. In such embodiments, the first and second flows are sent through the same TEP associated with the particular NUMA node. In other embodiments, the particular TEP that is the source TEP of the first data message flow is a first TEP associated with the particular NUMA node, and the selected TEP is a second TEP associated with the second NUMA node. In such embodiments, the first and second flows are sent through different TEPs, but the different TEPs are both associated with the particular NUMA node.

In some embodiments, the source network address of the first data message flow and the destination network address of the second data message flow are a MAC address of the first machine. In such embodiments, the virtual switch uses the MAC address of the first machine to maintain a the mapping between the first machine and the particular NUMA node.

The set of TEPs of the first host computer is in some embodiments a TEP group (TEPG). In such embodiments, all TEPs of the first host computer are members of the same TEP group, and the virtual switch uses machine to NUMA node mappings in addition to NUMA node to TEP mappings to forward flows to the first host computer.

Some embodiments do not send a data message to the NUMA node on which an overlay workload (e.g., a machine, such as a VM) is running. In such embodiments, a data message is received at another NUMA node that provides the data message to the NUMA node executing the overlay workload. This causes performance degradation as there is memory transfer across the processor interconnect (e.g., QPI) that connects the NUMA nodes. Traditional Link Aggregation using Link Aggregation Control Protocol (LACP) cannot guarantee that transmitted (Tx) and received (Rx) data messages are sent through a network interface card (NIC) that is connected to the same NUMA node executing the overlay workload.

A NUMA-based server is implemented using multiple NUMA nodes in some embodiments in order to use multiple processors and memories. In some embodiments, each NUMA node includes its own local memory and set of processors that can access data other local memories of the other NUMA nodes. All NUMA nodes execute on a single server, host computer, or appliance.

SDN software running on one NUMA node in some embodiments can access memory (e.g., when accessing data messages) that is allocated from another NUMA node. Using its set of processors, the SDN software running on the NUMA node in some embodiments performs a set of one or more operations on a data message flow before forwarding it to its next hop or to its destination. In some embodiments, the SDN software running on a NUMA node performs middlebox services (e.g., firewall services, load balancing services, intrusion detection services, intrusion prevention services, etc.) on a data message flow before forwarding the data message. These middlebox services are performed by retrieving data from a local and/or remote memory.

Any application or distributed middlebox service (e.g., distributed firewall service, distributed network address translation service, etc.) can be implemented on a set of NUMA nodes executing on one or more host computers for processing data message flows. Any machine (e.g., VM, container, pod) can be implemented on a set of NUMA nodes that executes the applications as sources and destinations of data message flows.

Figure 1B:
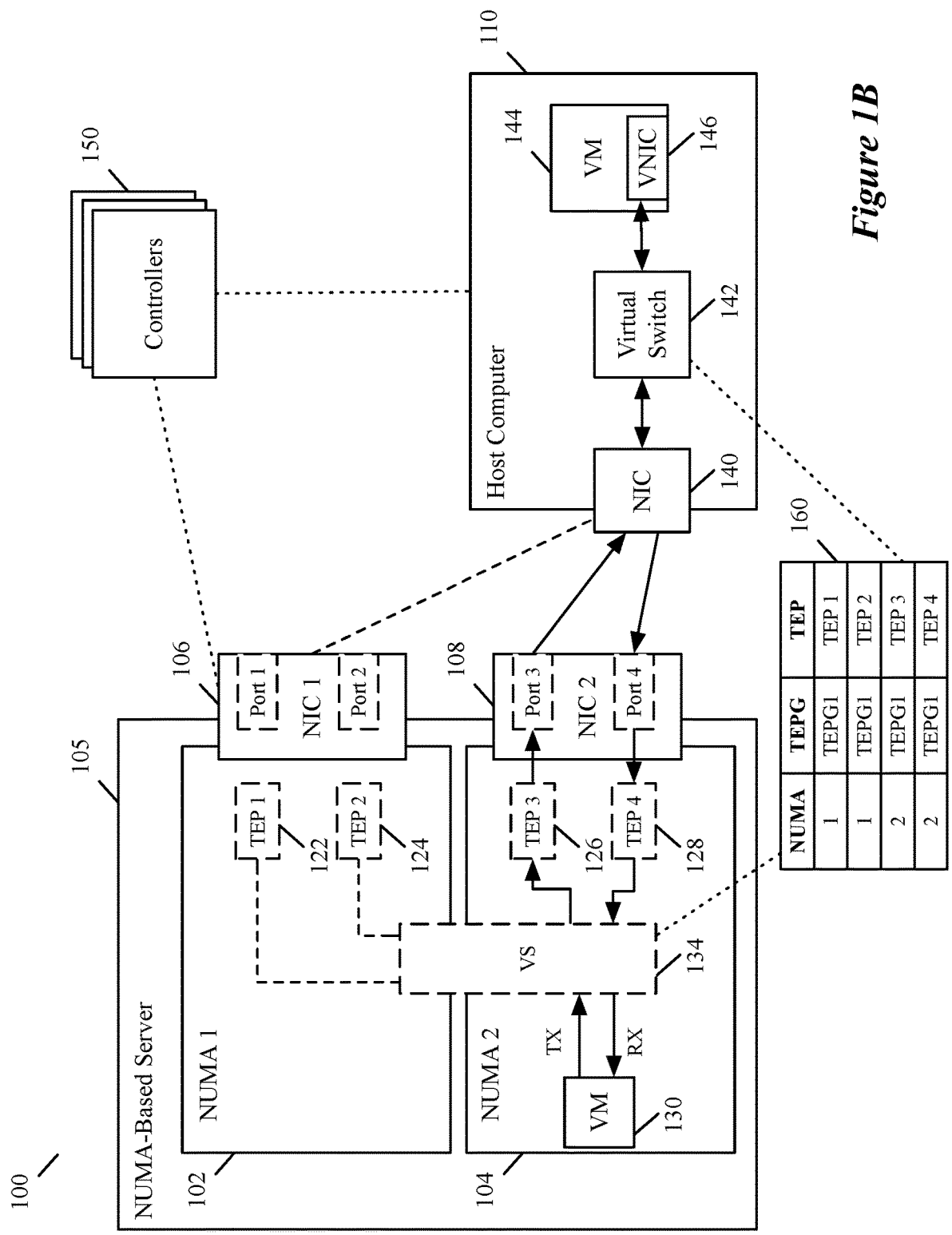

FIGS. 1A-B illustrate an example SDN 100 including a NUMA-based server 105 that exchanges data message flows with a host computer 110 of the SDN 100. The NUMA-based server 105 includes a first NUMA node 102 and a second NUMA node 104. Each of the NUMA nodes 102-104 is respectively connected to a NIC 106 and 108 which allows the NUMA nodes 102-104 to connect to the host computer 110. While only two NUMA nodes 102-104 are illustrated, the NUMA-based server 105 can execute any number of NUMA nodes. While only one host computer 110 is illustrated, the SDN 100 can include any number of host computers that can communicate with each other and with the NUMA-based server 105. The NICs 106-108 are physical NICs (PNICs) connected to the NUMA nodes 102-104.

Each of the NUMA nodes 102-104 has a set of one or more peripheral component interconnect (PCI) slots. A first NIC 106 is connected to the first NUMA node 102, as it is inserted to a PCI slot associated with the NUMA node 102. A second NIC 108 is connected to the second NUMA node 104, as it is inserted to a PCI slot associated with the NUMA node 104.

The first NIC 106 connected to the first NUMA node 102 has two ports 1-2 and is associated with two TEPs 122 and 124, which are virtual tunnel endpoints of the NIC 106. The second NIC 108 connected to the second NUMA node 104 also has two ports 3-4 is associated with two other TEPs 126 and 128, which are virtual tunnel endpoints of the NIC 108. In some embodiments, the TEPs 122-128 are respectively associated with the ports (i.e., uplink interfaces) of the NICs 106-108 such that one TEP is associated with one port of a NIC.

When a machine (e.g., VM 130 or another VM, container, or pod) wishes to send a data message to another machine in a different virtual network or on a different host, the TEP encapsulates the original Ethernet frame with the necessary overlay headers. This encapsulated data message can then be transmitted across the physical network. When the encapsulated data message arrives at its destination TEP, it is decapsulated and the original Ethernet frame is extracted. This allows the destination machine to receive the data message in its native format and ensures that the data message is correctly routed to the appropriate destination.

A VM 130 also executes on the second NUMA node 104. In some embodiments, the VM 130 executes one or more applications that are the sources and destinations of data message flows exchanged with the host computer 110. The first and second NUMA nodes 102-104 can execute any number of VMs or other machines, such as containers or pods.

The NUMA-based server 100 executes a virtual switch 132 that spans all of the NUMA nodes 102-104. For example, the virtual switch 132 is in some embodiments a distributed virtual switch (DVS) implemented by different DVS instances executing on different NUMA nodes. The virtual switch 132 (also referred to as a software switch, in some embodiments) exchanges the flows from machines executing on the NUMA nodes 102-104 with the NICs 106-108. For example, the virtual switch 132 exchanges flows between the VM 130 and the NICs 106-108 of the NUMA-based server 105.

The host computer 110 includes a NIC 140 to connect to the NICs 106-108 of the NUMA-based server 105, a virtual switch 142 (also referred to as a software switch, in some embodiments), and a VM 144. The virtual switch 142 receives data message flows from the VM 144, through a VNIC 146 of the VM 144, and provides them to the NIC 140 to forward to the NUMA-based server 105. The virtual switch 142 also receives flows from the NIC 140, which received them from the NUMA-based server 105 (e.g., from the VM 130), and provides them to the VM 144 through the VNIC 146.

The SDN 100, the NUMA-based server 105, and the host computer 110 are configured by a set of one or more controllers 150. For instance, the controller set 150 in some embodiments instantiates and configures the VM 130 on the second NUMA node 104 and the VM 144 on the host computer 110. The controller set 150 in some embodiments is also responsible for defining and distributing forwarding rules among the NUMA-based server 105 and the host computer 110.

FIG. 1A illustrates the VM 130 sending transmitted (Tx) flows to the virtual switch 132, which encapsulates them with its source TEP as the first TEP 122 of the first NIC, and forwards the encapsulated flows through port 1 of the first NIC 106 to reach the VM 144. The VM 130 receives receiving (Rx) flows from the virtual switch 132, which are encapsulated with a destination TEP 122, and receives them through the first port of the first NIC 106. Because the SDN software of NUMA nodes can access the local memories of other NUMA nodes, flows exchanged between a NUMA node and an external source or destination (e.g., the VM 144) can be sent through a NIC of another NUMA node. Further information regarding memory access of NUMA nodes will be described below.

Even though the virtual switch 132 can encapsulate flows with the TEPs 126-128 of the NIC 106 on the same NUMA node 104, there is no way to ensure this happens. The virtual switch 132 simply encapsulates the flows with any TEP of the NUMA-based server 105. Because the Tx and Rx flows are executed on the first NUMA node 102 to be forwarded to the VM 144 instead of forwarding them out of the second NUMA node's NIC 108, the Tx and Rx flows experience a higher latency.

FIG. 1B illustrates the SDN 100 after a NUMA node to TEP mapping table 160 has been generated and provided to the host computer 110 (i.e., to the virtual switch 142). The table 160 is generated in some embodiments by the virtual switch 132 of the NUMA-based server 105. After generating the table 160, it is provided to the controller set 150, which provides it to the each host computer of the SDN 100. Each host computer of the SDN 100 uses the table 160 when sending flows to and receiving flows from the NUMA-based server 105. In this example, each entry in the table 160 specifies a NUMA node, a TEPG associated with the NUMA node, and a TEP associated with the NUMA node. However, in other embodiments, the table 160 does not specify the TEPG associated with the NUMA node.

Using the table 160, the virtual switch 132 encapsulates the Tx flows with an encapsulating header specifying the third TEP 126 as the source TEP before forwarding the Tx flows through port 3 of the second NIC 108 to reach the VM 144. Similarly, the virtual switch 142 uses the table 160 to encapsulate Rx flows with an encapsulating header specifying the fourth TEP 128 as the destination TEP before forwarding the Rx flows to the NUMA-based server 105. Now, the Rx and Tx flows are ensured to be forwarded through the NIC 108 connected to the NUMA-based server 104 executing the VM 130, which ensures (1) a faster bandwidth as multiple ports of the NIC 108 can be used for load balancing, and (2) no latency penalty as cross-NUMA node data transfer is avoided.

The virtual switches 134 and 142 in FIG. 1B increase the throughput of the Tx and Rx flows by load balancing the flows across all available ports of all NICs (i.e., NIC 108) associated with the NUMA node 104 executing the VM 130. This is unlike the example of FIG. 1A, where all traffic to and from the VM 130 is sent through one port of one NIC 106, which can cause congestion and bandwidth issues when it has to contest with other traffic (e.g., another machine (not shown) executing on one of the NUMA nodes 102-104) that is also sent through the same NIC 106.

The example of FIG. 1B also differs from the example of FIG. 1A as FIG. 1B considers the latency implications of cross NUMA NIC usage. More specifically, the example of FIG. 1B uses load balancing to determine which NIC port to send traffic to and from the VM 130, but also ensures that no latency regressions occur. As such, the traffic sent to and from the VM 130 are load balanced across only the TEPs associated with the NIC 108 connected to the NUMA node 104 executing the VM 130 (i.e., no TEPs associated with other NUMA nodes, such as NUMA node 102, are considered). By doing so, the latency of the flows is not impacted.

Figure 2:
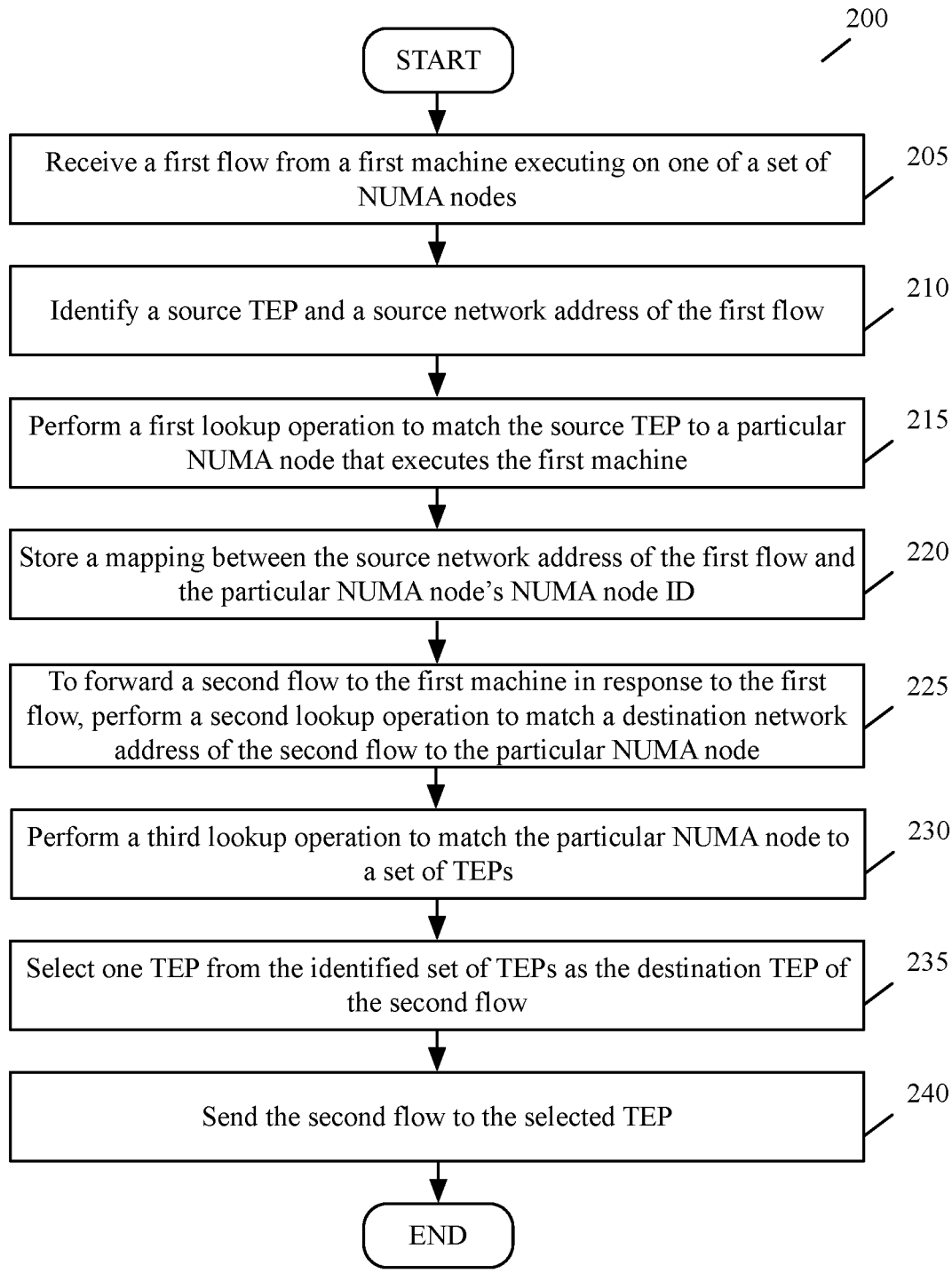
FIG. 2 conceptually illustrates a process of some embodiments for forwarding data messages between a first host computer executing NUMA nodes and a second host computer.

FIG. 2 illustrates a process 200 of some embodiments for forwarding data messages between first and second host computers. This process 200 is performed in some embodiments by a virtual switch of the second host computer. In some embodiments, the first host computer is a NUMA-based server executing a set of two or more NUMA nodes. At least one of the NUMA nodes executes a first machine (e.g., VM, container, pod) that exchanges flows with a second machine of the second host computer. The process 200 is performed in some embodiments after the first host computer generated and provided a NUMA node to TEP mapping table to the second host computer (e.g., through a controller set that configures the first and second host computers).

The process 200 begins by receiving (at 205) a first flow from a first machine executing on one of the set of NUMA nodes. The virtual switch receives, from the first machine, a first flow that specifies its destination as the second machine. In some embodiments, the virtual switch receives the flow from a NIC (i.e., a PNIC) connected to the second host computer.

Next, the process 200 identifies (at 210) a source TEP and a source network address of the first flow. The virtual switch examines the source network address specified in a first header of the first flow. In some embodiments, the identified source network address is the source MAC address of the first machine. The virtual switch also identifies, from an encapsulating second header of the first flow, the source TEP which identifies which TEP of the first host computer through which the first flow was sent. The identified source TEP in some embodiments is a TEP ID.

At 215, the process 200 performs a first lookup operation to match the identified source TEP to a particular NUMA node that executes the first machine. The virtual switch uses the NUMA node to TEP mapping table it stores to determine which NUMA node is associated with the identified source TEP. In some embodiments, the virtual switch examines one or more mapping entries of the table to identify a particular mapping entry that specifies the identified source TEP. Then, the virtual switch examines the particular mapping entry to identify a particular NUMA node ID stored in the particular mapping entry, which identifies the particular NUMA node. By identifying the particular NUMA node ID, the virtual switch determines which NUMA node executes the first machine.

Then, the process 200 stores (at 220) a mapping between the source network address of the first flow and the particular NUMA node's NUMA node ID. After identifying which NUMA node executes the first machine, the virtual switch stores this mapping to maintain this information. In some embodiments, the virtual switch stores this mapping in a second mapping table separate from the first mapping table that stores the NUMA node to TEP mappings. These two mapping types are in some embodiments stored in a same data store of the second host computer. In other embodiments, they are stored in different data stores of the second host computer. After storing this mapping, the virtual switch can provide the first flow to the second machine.

To forward a second flow to the first machine in response to the first flow, the process 200 performs (at 225) a second lookup operation to match a destination network address of the second flow to the particular NUMA node. The virtual switch in some embodiments receives the second flow from the second machine to send to the first machine in response to the first flow. After receiving the second flow, the virtual switch examines a header of the second flow to identify the destination network address of the second flow. The destination network address is in some embodiments the MAC address of the first machine. Then, the virtual switch performs a lookup in its second mapping table to match the identified network address to the particular NUMA node that executes the first machine, i.e., to the particular NUMA node ID.

At 230, the process 200 performs a third lookup operation to match the particular NUMA node to a set of TEPs. Using the particular NUMA node ID identified from the second mapping table, the virtual switch performs a lookup in the first mapping table to identify each TEP associated with the particular NUMA node. In some embodiments, the virtual switch matches the particular NUMA node ID to a set of one or more mapping entries mapping the particular NUMA node ID to a set of one or more TEP IDs (including a TEP ID associated with source TEP identified from the first flow). The virtual switch identifies all TEP IDs associated with the particular NUMA node ID in order to identify which TEPs are associated with the particular NUMA node executing the first machine.

Then, the process 200 selects (at 235) one TEP from the identified set of TEPs as the destination TEP of the second flow. The virtual switch selects a TEP from all TEPs associated with the particular NUMA node to forward the second flow. In some embodiments, the virtual switch performs a load balancing operation to select a TEP from the identified set of TEPs. In other embodiments, the virtual switch selects a TEP non-deterministically.

Lastly, the process 200 sends (at 240) the second flow to the selected TEP. The virtual switch, after selecting a TEP, encapsulates the second flow with an encapsulating header that specifies the selected TEP. Then, the virtual switch provides the encapsulated flow to the NIC (i.e., a PNIC) of the second host computer to provide it to the selected TEP of the first host computer. After sending the second flow to the selected TEP, the process 200 ends.

Figure 3:
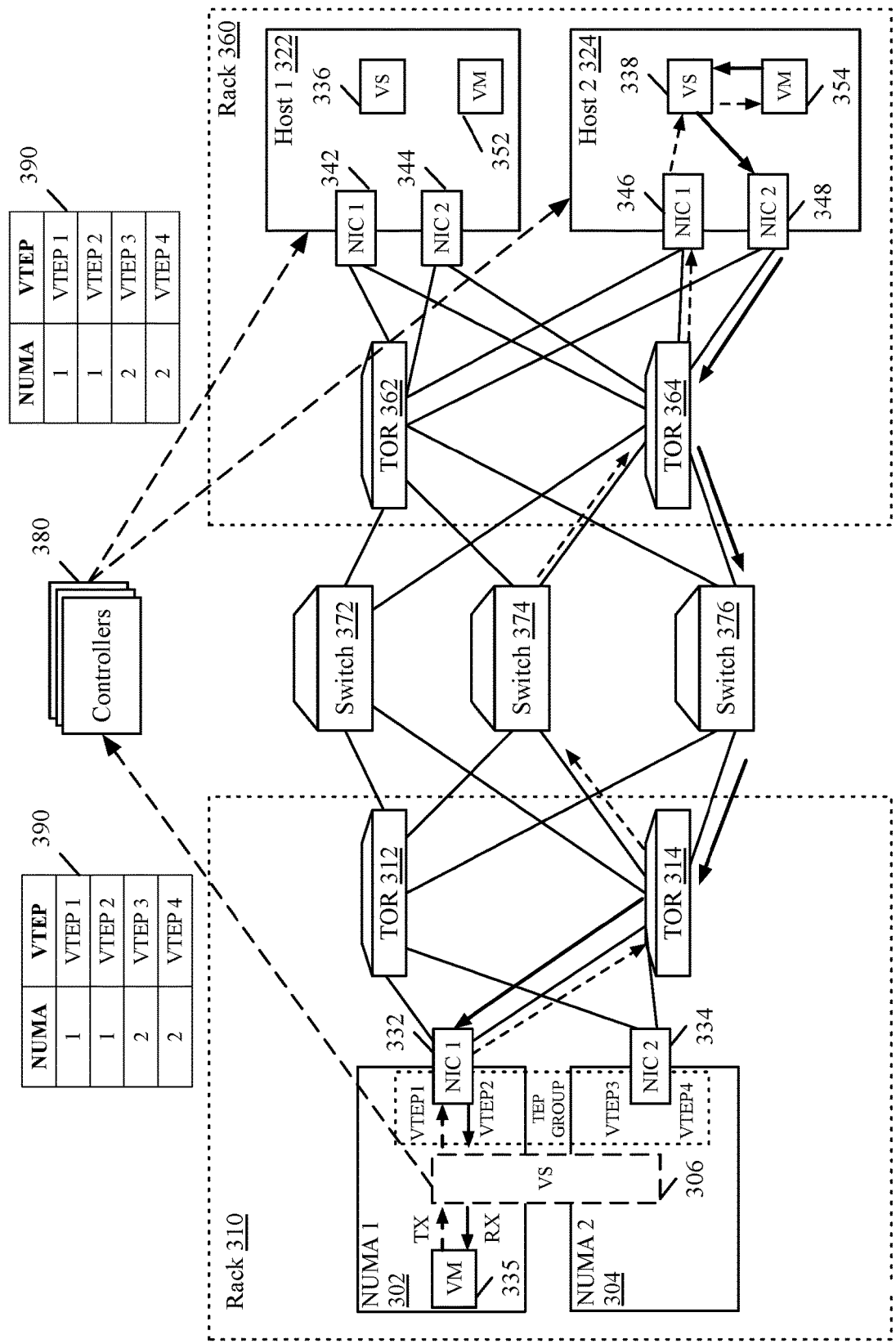
FIG. 3 illustrates an example set of NUMA nodes that communicates with a set of host computers.

FIG. 3 illustrates an example set of NUMA nodes 302-304 that communicates with a set of host computers 322-324. A virtual switch 306 spans the NUMA nodes 302-304 and is connected to NICs 332-334 (which are PNICs). The first NIC 332 connected to the first NUMA node 302 is associated with two VTEPs, VTEP1 and VTEP2. The second NIC 334 connected to the second NUMA node 304 is associated with two other VTEPs, VTEP3 and VTEP4. The first NUMA node 302 also executes a VM 335.

In some embodiments, the VTEPs 1-4 of the NICs 332-334 are defined as a TEP group (TEPG). In such embodiments, one TEPG is defined for all VTEPs of the NUMA nodes 302-304. The NUMA nodes 302-304 execute on a same NUMA-based server (i.e., on a same host computer).

The first and second NUMA nodes 302-304 are part of a first rack 310 along with two Top-of-Rack (ToR) switches 312-314. Each of the NICs 332-334 connect to each of the ToR switches 312-314.

The host computers 322-324 respectively include virtual switches 336-338, and each host computer 322-324 connects to a set of two NICs 342-344 and 346-348. The first host computer 322 executes a VM 352, and the second host computer 324 executes a VM 354.

The first and second host computers 322-324 are part of a second rack 360 along with two ToR switches 362-364. Each of the NICs 342-348 connects to each of the ToR switches 362-364. The first rack ToR switches 312-314 connect to the second rack ToR switches 362-364 through a set spine switches 372-376.

The NUMA nodes 302-304 and host computers 322-324 are configured by a set of one or more controllers 380. When the virtual switch 306 generates a NUMA node to VTEP mapping table 390, the virtual switch 306 provides it to the controller set 380. After receiving the table 390, the controller set 380 provides it to the host computers 322-324 to use to exchange flows with the NUMA nodes 302-304.

As shown using dashed arrowed lines, the VM 335 executing on the first NUMA node 302 sends Tx flows, which are destined for the VM 354, to the virtual switch 306, which encapsulates them with an encapsulating header specifying VTEP1 and sends them through VTEP1 of the first NIC 332. The NIC 332 sends the Tx flows to the ToR switch 314, which sends them to the spine switch 374. The spine switch 374 sends the Tx flows to the ToR switch 364, which sends them to NIC 346. The NIC 346 provides the Tx flows to the virtual switch 338.

After receiving the Tx flows, the virtual switch 338 uses the table 390 and the VTEP ID specified in the Tx flows' encapsulating header to identify which NUMA node (i.e., NUMA node 302) is associated with the source VTEP (i.e., VTEP1) from which the Tx flows were sent. Using this information, the virtual switch 338 is able to send subsequent flows to the VM 335 using any of the VTEPs specified as being associated with the NUMA node 302 in the table 390, as it now knows which NUMA node executes the VM 335.

In some embodiments, the virtual switch 338 creates a bridge table entry, which specifies the source network address of the Tx flows, a TEPG ID identifying the TEPG of the NUMA node VTEPs, and a NUMA node ID identifying the first NUMA node. Then, the virtual switch 338 provides the Tx flows to the destination VM 354.

As shown using solid arrowed lines, the VM 354 sends the responsive Rx flows, which are destined for the VM 335, to the virtual switch 338. The virtual switch 338 identifies the destination network address of the Rx flows, which is the network address of the VM 335. Because the virtual switch 338 knows which NUMA node (i.e., the first NUMA node 302) executes the VM 335, the virtual switch 338 performs another lookup in the table 390 to determine all of the VTEPs (i.e., VTEPs 1 and 2) that are associated with the first NUMA node 302. After identifying these VTEPs, the virtual switch 338 selects one of them to which to send the Rx flows. In this example, the virtual switch 338 selects VTEP2.

After selecting the destination VTEP, the virtual switch 338 encapsulates the Rx flows with an encapsulating header specifying VTEP2, and sends the encapsulated Rx flows to the NIC 348, which forwards them to the ToR switch 364. The ToR switch 364 sends the Rx flows to the spine switch 376, which sends them to the ToR switch 314. Then, the ToR switch 314 sends the Rx flows to VTEP2 of the first NIC 332, as it is specified in the encapsulating header. Then, the Rx flows are received at the virtual switch 306, which provides them to the destination VM 335.

Figure 4:
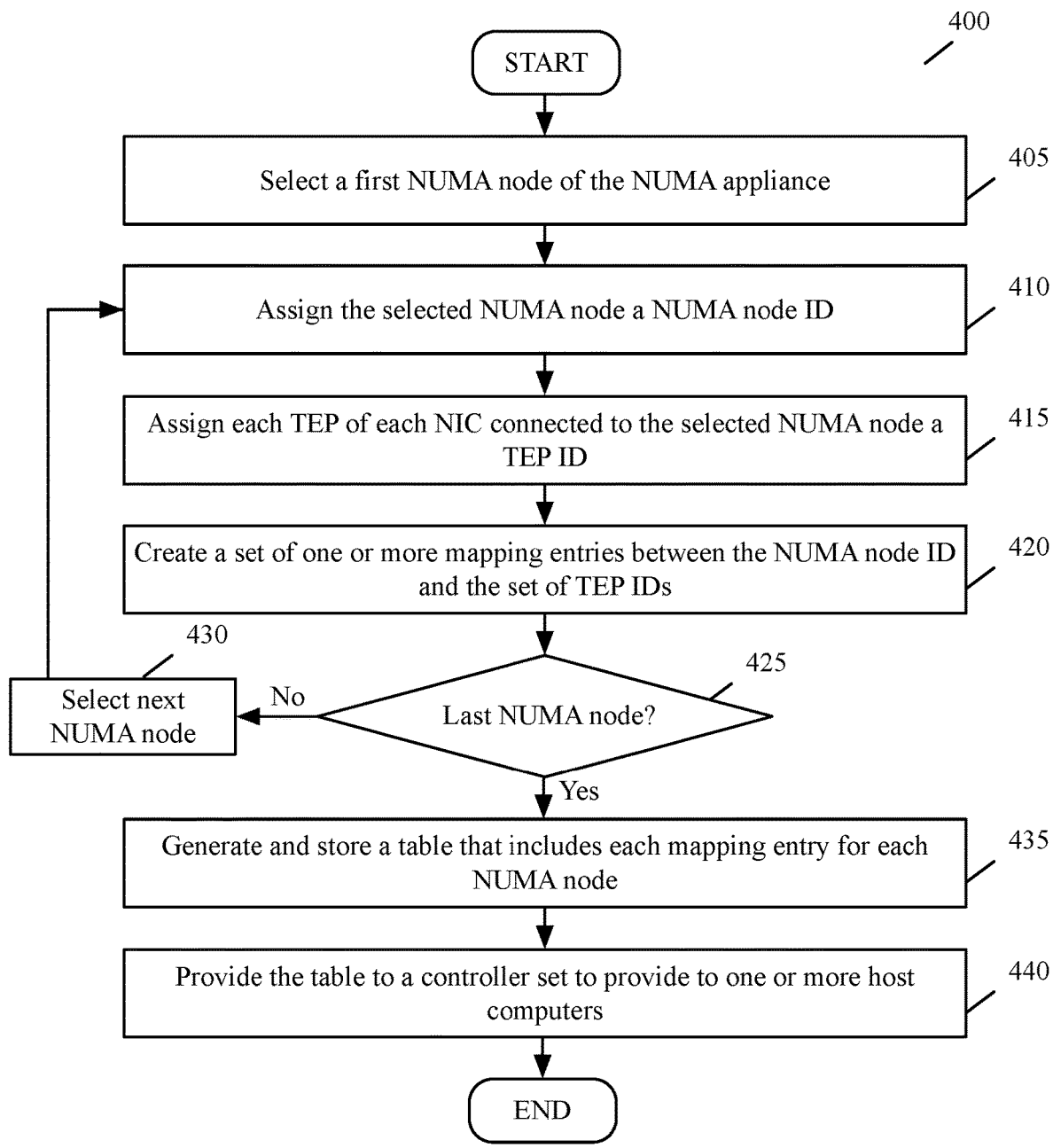
FIG. 4 conceptually illustrates a process of some embodiments for generating a NUMA node to TEP mapping table.

As discussed previously, a virtual switch (also referred to as a software switch) associated with a set of NUMA nodes in some embodiments generates a NUMA node to TEP mapping table that specifies which TEPs are associated with which NUMA node. FIG. 4 conceptually illustrates a process 400 of some embodiments for generating a NUMA node to TEP mapping table. The process 400 is performed in some embodiments by a virtual switch spanning a set of NUMA nodes including a first NUMA node. In some of these embodiments, the virtual switch is a DVS implemented by different instances each executing on the different NUMA nodes. Alternatively, the virtual switch executes along with the NUMA nodes on the same server executing the NUMA nodes.

In some embodiments, the process 400 is performed after the set of NUMA nodes is initially configured by a set of one or more controllers (i.e., after the set of NUMA nodes has been instantiated). The controller set configures an SDN that includes the set of NUMA nodes. In other embodiments, the process 400 is performed after being directed to do so by the set of controllers configuring the SDN and the set of NUMA nodes.

The process 400 begins by selecting (at 405) a first NUMA node of the NUMA-based server. The virtual switch of some embodiments needs to perform each of the steps 410-420 for each NUMA node of the NUMA-based server. As such, the virtual switch selects a first NUMA node of the NUMA-based server to perform the steps 410-420.

Next, the process 400 assigns (at 410) the selected NUMA node a NUMA node ID. In some embodiments, the virtual switch assigns the selected NUMA node a unique identifier from each of the other NUMA nodes. The NUMA node ID can be a numerical ID, such as NUMA-1 through NUMA-N. Alternatively, the NUMA node ID can be a universally unique identifier (UUID) or a globally unique identifier (GUID). Any suitable identifier for a NUMA node can be used.

At 415, the process 400 assigns each TEP of each NIC connected to the selected NUMA node a TEP ID. The virtual switch of some embodiments identifies each NIC (i.e., each PNIC) connected to the selected NUMA node and identifies each TEP of each identified NIC to assign each TEP a unique TEP ID. The TEP ID can be a numerical ID, such as TEP-1 through TEP-N. Alternatively, the TEP ID can be a UUID or a GUID. Any suitable identifier for a TEP can be used.

Then, the process 400 creates (at 420) a set of one or more mapping entries between the assigned NUMA node ID and the set of TEP IDs. To associate the NUMA node ID with each TEP ID of the associated TEPs, the virtual switch generates one or more mapping entries to associate the NUMA node ID with the set of TEP IDs. In some embodiments, the virtual switch creates a different mapping entry for each TEP ID, such that each mapping entry specifies the NUMA node ID and a different TEP. In such embodiments, the virtual switch creates as many mapping entries for the NUMA node as there are TEPs associated with the NUMA node. In other embodiments, the virtual switch creates a single mapping entry for the set of TEP IDs, such that the single mapping entry specifies the NUMA node ID and each of the set of TEP IDs.

Next, the process 400 determines (at 425) whether the selected NUMA node is the last NUMA node. To ensure that all NUMA nodes of the NUMA-based server has mapping entries created for them, the virtual switch determines whether selected NUMA node is the last NUMA node for which it has to create one or more mapping entries. If the process 400 determines that the selected NUMA node is not the last NUMA node (i.e., that one or more NUMA nodes need to have mapping entries created for them), the process 400 selects (at 430) a next NUMA node and returns to step 410.

If the process 400 determines that the selected NUMA node is the last NUMA node (i.e., that all NUMA nodes have mapping entries created for them), the process 400 generates (at 435) and stores a table that includes each mapping entry for each NUMA node. After creating mapping entries for each NUMA node, the virtual switch creates the table to specify each created mapping entry. Then, the virtual switch stores the table in a local data store to maintain mappings between each NUMA node and each TEP of the NUMA-based server.

Lastly, the process 400 provides (at 440) the table to the controller set that configures the NUMA-based server to provide the table to one or more host computers. The virtual switch provides the table to the controller set so that the controller set can provide it to host computers that may communicate with the NUMA-based server. In some embodiments, the controller set provides the table to each other host computer in the SDN. In other embodiments, the controller set provides the table to a subset of host computers in the SDN that the controller set knows communicates with the set of NUMA nodes. After providing the table to the controller set, the process 400 ends.

Figure 5:
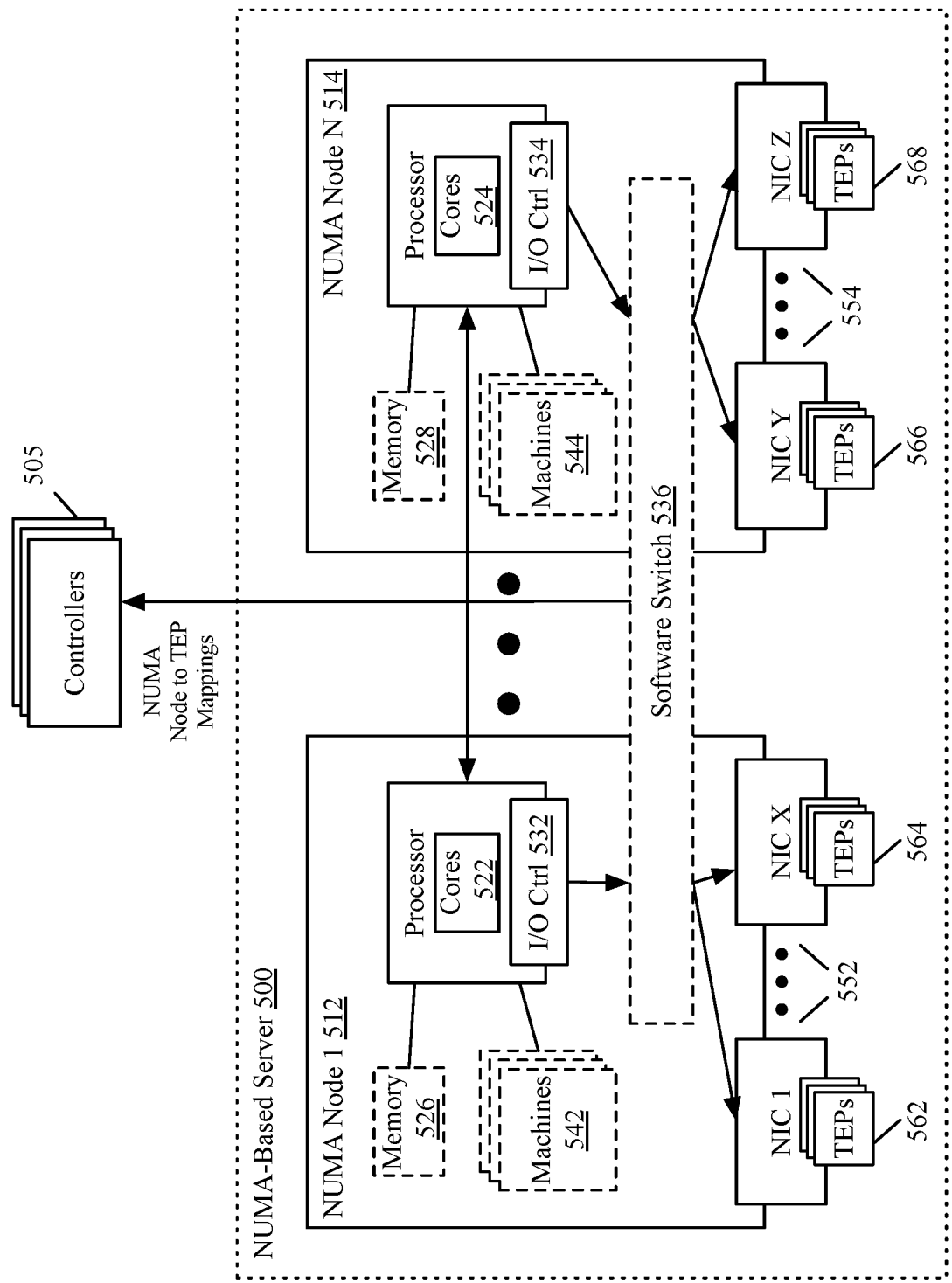
FIG. 5 illustrates an example NUMA-based server that creates NUMA node to TEP mappings to provide to a controller set that configures the NUMA-based server.

FIG. 5 illustrates an example NUMA-based server 500 that creates NUMA node to TEP mappings to provide to a controller set 505 that configures the NUMA-based server 500. The NUMA-based server 500 hosts a set of NUMA nodes (also referred to as sockets). The NUMA-based server 500 in some embodiments is a single server, host computer, or standalone appliance executing a set of NUMA nodes. The NUMA-based server 500 can execute any number of NUMA nodes.

In this example, each NUMA node 512-514 includes a processor with one or more processor cores 522-524, a local memory 526-528, an input/output (I/O) controller 532-534, and a set of one or more machines 542-544. The NUMA-based server 500 also includes a software switch 536 that spans all of the NUMA nodes 512-514. The software components of the NUMA nodes 512-514 are denoted by dashed lines, while the hardware components of the NUMA nodes 512-514 are denoted by solid lines. The memories 526-528 are shared amongst the different nodes, but local accesses (i.e., accesses to memory 526 on the same node as the processor core 522) are fastest, as the access does not need to go across interconnects (e.g., Intel QuickPath Interconnect (QPI), Intel Ultra Path Interconnect (UPI), etc.) between the different nodes. The processor cores 522-524 are the elements that perform various operations on data stored in the memories 526-528. The I/O controllers 532-534 manage data communications between the nodes and other elements (e.g., NICs, storage, etc.) of the appliance 500.

In some embodiments, the locality of a node with other elements is based on connections between the I/O controller of a node and the element (e.g., a NIC is local to a particular node when the I/O controller of the particular node directly communicates with the NIC). In some embodiments, one or more of the machines 542-544 perform one or more middlebox services on data message flows sent to and from external components (e.g., external machines executing on external host computers). In some of these embodiments, the processor and cores 522-524 perform middlebox services. The middlebox services may be any middlebox services that are performed on data messages, such as a firewall service, load balancing service, a source and/or destination network address translation service, etc.

NICs 552-542 of some embodiments are PNICs that connect the appliance 500 to the other host computers through a network (not shown). Each NUMA node 512-514 can connect to any number of NICs 552-554. In some embodiments, the NICs connect to a network or a physical switch that directly connects to NICs of other machines in the network. In virtual networking and software defined network, the physical NICs are linked to virtual switches to provide network connectivity between servers. Although this example is shown with two nodes and one set of NICs per node, one skilled in the art will recognize that the invention is not limited to any particular configuration.

Each NIC 552-554 is associated with its own set of one or more TEPs 562-568. The TEPs 562-568 are the tunnel endpoints from which data messages enter and exit the NUMA-based server 500.

In some embodiments, flows sent from a first NUMA node (e.g., node 512) are sent to another NUMA node (e.g., 514) before they are forwarded to their external destination(s). However, exchanging these flows across an interconnect between the NUMA nodes increases the latency, resulting in a sub-optimal processing overhead. To obviate this issue, some embodiments utilize the TEPs 562-568 to map them to each of the NUMA nodes 512-514.

In some of these embodiments, the software switch 536 creates one or more mappings to associate each NUMA node with its associated TEPs. For example, the software switch 536 generates one or more mappings to associate the first NUMA node 512 with the TEPs 562-564. Then, the software switch 536 provides the generated mappings to the controller set 505.

Figure 6:
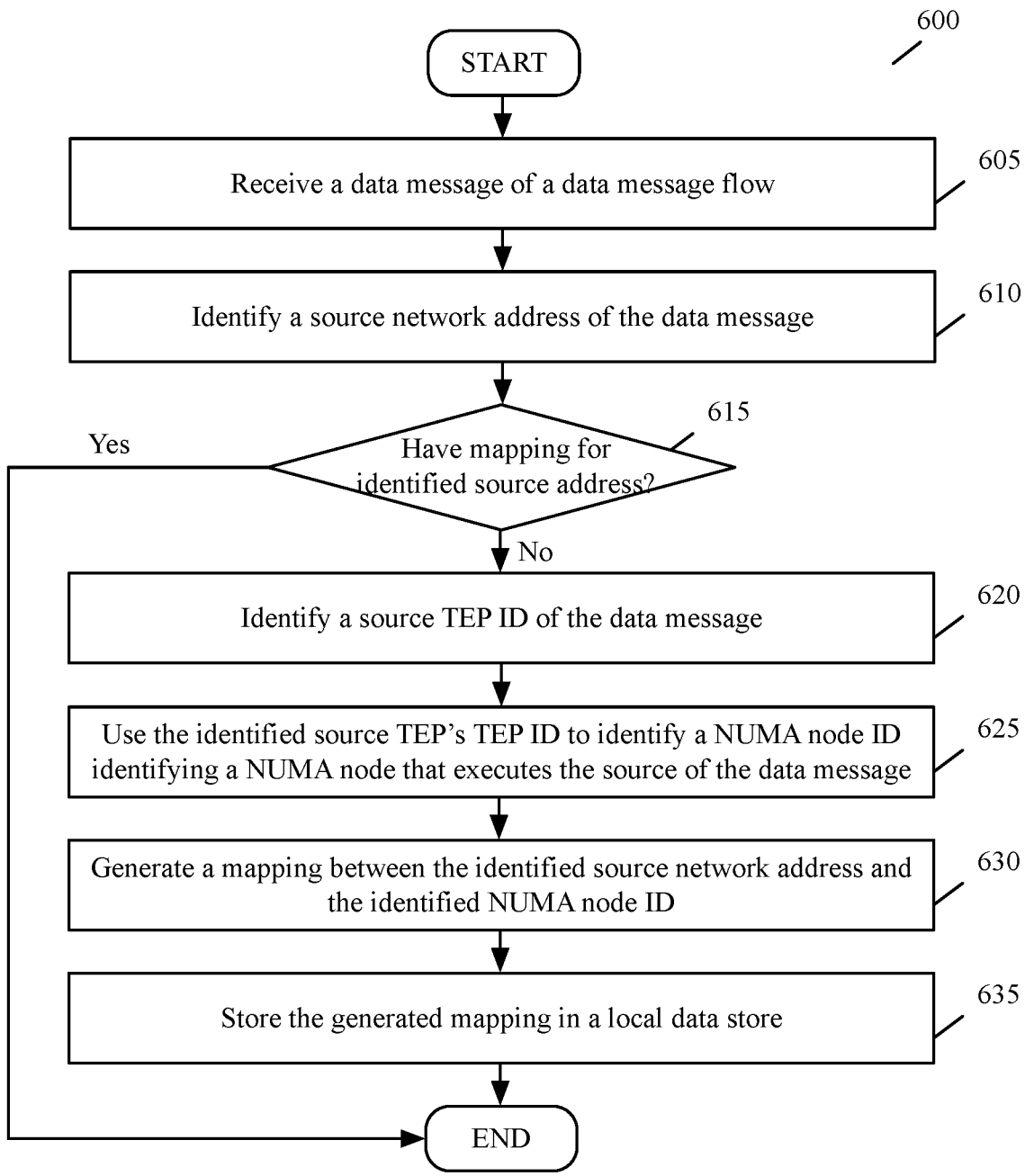
FIG. 6 conceptually illustrates a process of some embodiments for exchanging flows with a set of NUMA nodes of an SDN.

A controller of an SDN in some embodiments receives NUMA node to TEP mappings from a NUMA-based server and provides the mappings to other host computers in the SDN. Then, software switches of the other host computers use the mappings when receiving flows from the NUMA-based server and when sending flows to the NUMA-based server. FIG. 6 conceptually illustrates a process 600 of some embodiments for exchanging flows with a set of NUMA nodes of an SDN. The process 600 is performed in some embodiments by a software switch (also referred to as a virtual switch) executing on a host computer in the SDN. The SDN includes in some embodiments one or more other host computers, each executing its own software switch. The set of NUMA nodes executes on one NUMA-based server (i.e., one host computer).

The software switch in some embodiments stores, in a local data store of the host computer, a table that includes NUMA node to TEP mapping entries. This table is generated by at least one of the set of NUMA nodes and is provided to the controller of the SDN to provide it to the software switch. The steps of the process 600 are performed in some embodiments in the order described below. In other embodiments, the steps of the process 600 are performed in a different order than described below. Still, in other embodiments, one or more of the steps of the process 600 are performed simultaneously.

The process 600 begins by receiving (at 605) a data message of a data message flow. The software switch in some embodiments receives the data message from a NIC of the host computer, which received it from a NIC connected to one of the NUMA nodes. In some embodiments, the NIC of the NUMA nodes sends the data message through one or more intervening switches (e.g., ToR switches) to reach the NIC of the host computer.

Next, the process 600 identifies (at 610) a source network address of the data message. The software switch in some embodiments examines a header of the data message to identify the source MAC address of the data message. In identifying the source network address, the virtual switch identifies the source machine of the data message.

At 615, the process 600 determines whether a network address to NUMA node mapping is already stored for the identified source network address. In some embodiments, for each machine of a NUMA node that exchanges flows with the virtual switch, the virtual switch maintains a mapping between the machine and the NUMA node on which it executes in order to exchange the flows with the TEPs of that NUMA node's NIC(s). This ensures that the virtual switch avoids sending a flow to a TEP of a different NUMA node's NIC, which increases latency of the flow. In some embodiments, the virtual switch determines whether the identified source network address already has a stored mapping, as the virtual switch does not need multiple identical mapping entries for the same source network address.

If the process 600 determines that a mapping is already stored for the identified source network address, the process 600 ends. Because the virtual switch already stores a network address to NUMA node mapping for the source machine of the received data message (e.g., because the virtual switch has already seen one or more other data messages from this machine), the virtual switch does not have to create a new mapping.

If the process 600 determines that a mapping is not already stored for the identified source network address, the process 600 identifies (at 620) a source TEP of the data message. In some embodiments, the data message is received with an encapsulating header that specifies a TEP ID associated with the source TEP. In such embodiments, the virtual switch examines the encapsulating header to identify the TEP ID.

Then, the process 600 uses (at 625) the identified source TEP's TEP ID to identify a NUMA node ID identifying a particular NUMA node that executes the source of the data message. The virtual switch in some embodiments performs a lookup operation in its stored NUMA node to TEP mapping table to identify which NUMA node is associated with the identified TEP ID. To identify the particular NUMA node's NUMA node ID, the virtual switch compares the identified source TEP's TEP ID with TEP IDs specified in the mapping table until the virtual switch finds an entry that specifies the source TEP's TEP ID.

At 630, the process 600 generates a mapping between the identified source network address and the identified NUMA node ID. After identifying the particular NUMA node as being associated with the source TEP's TEP ID, the virtual switch knows that the source machine identified by the source network address executes on the particular NUMA node. As such, the virtual switch generates a mapping to associate the source machine's network address with the particular NUMA node's NUMA node ID.

Lastly, the process 600 stores (at 635) the generated mapping in a local data store. The virtual switch stores the network address to NUMA node ID mapping along with other network address to NUMA node ID mappings it has created and stored for other machines executing on the set of NUMA nodes. In some embodiments, this mapping is stored in the same data store as the NUMA node to TEP mappings. In other embodiments, this mapping is stored in a different data store than the NUMA node to TEP mappings. After storing the generated mapping, the process 600 ends.

Figure 7:
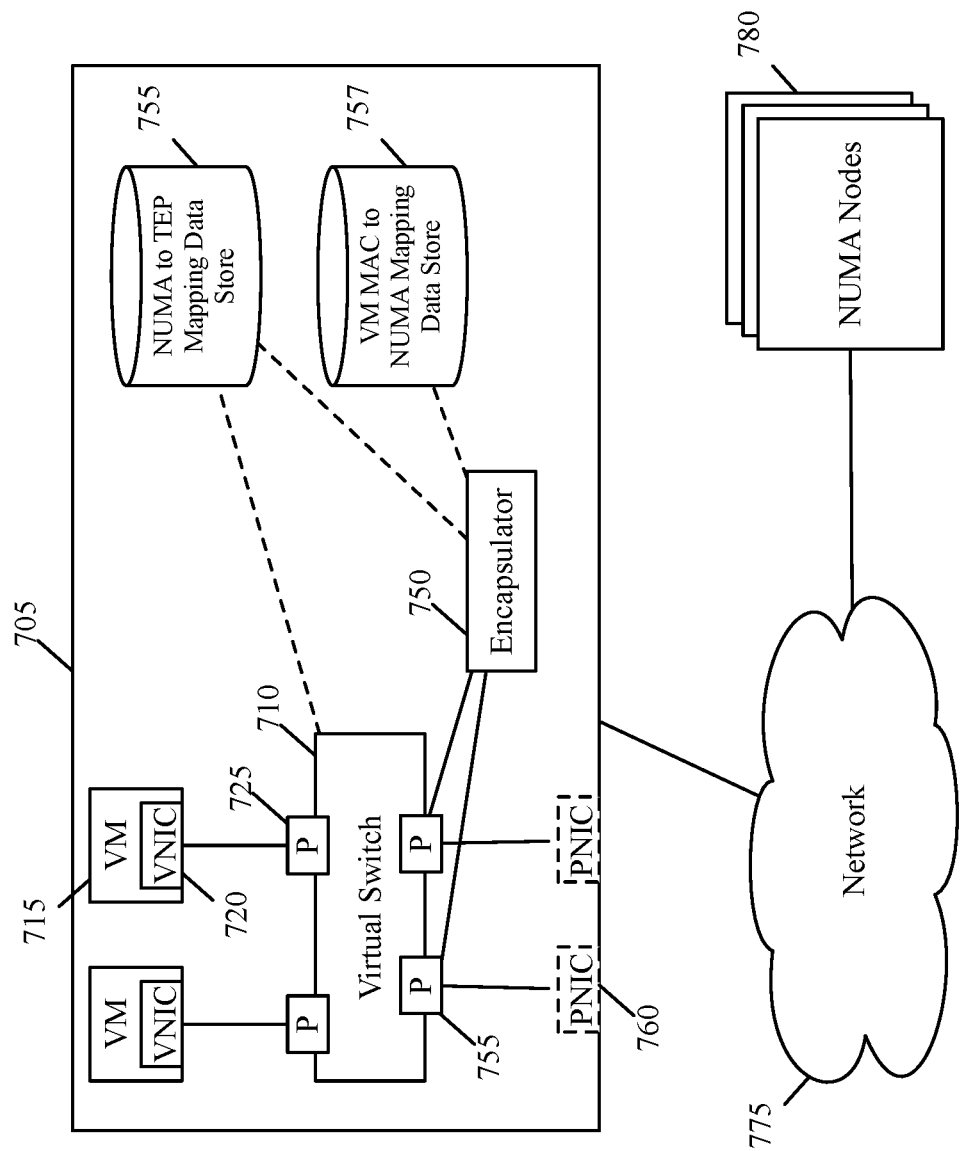
FIG. 7 illustrates an example host computer that communicates with one or more NUMA nodes.

FIG. 7 illustrates an example host computer 705 that communicates with a set of one or more NUMA nodes 780. In this example, the host computer 705 executes multiple VMs 715 along with a software switch 710 (also called a virtual switch). One or more applications execute on each VM, and these applications can be sources or destinations of data message flows between the VMs and between machines executing on the NUMA nodes 780. In some embodiments, the VMs 715 operate over a hypervisor (not shown) executing on the host computer 705, and the software switch 710 is a component of the hypervisor.

Each VM 715 of the host computer 705 has a virtual NIC (VNIC) 720 that is associated with a port 725 (e.g., an interface) of the virtual switch 710. In some embodiments, the virtual switch 710 has one uplink port 755 for each PNIC 760 of its host computer 705, and these uplink ports serve as TEPs for terminating tunnels used for forwarding overlay network data messages. The TEPGs in this example are groups of the virtual-switch uplinks ports 755. Each VM (e.g., each VM's VNIC 720 or VM's associated switch port 725) is associated with a TEPG.

For the VMs 715 to exchange data messages with the NUMA nodes 780, an encapsulator 750 encapsulates the data messages on the source host computer 705 with the IP addresses of the source and destination TEPs. The encapsulator 750 in some embodiments is an encapsulation service offered by the hypervisor that executes on the host computer 705. As shown, the encapsulator 750 in some embodiments is a service called by an uplink port 755 of the virtual switch 710. The encapsulator 750 is also referred to below as an overlay process, overlay module or overlay service as it performs encapsulation and decapsulation operations necessary for allowing overlay data messages of one or more logical networks to traverse the shared underlay physical network 775. Conjunctively or alternatively, the encapsulator 750 executes within the virtual switch 710.

The encapsulator 750 in some embodiments uses information stored in data stores 755 and 757 to encapsulate and decapsulate data messages. In such embodiments, the virtual switch 710 stores NUMA node to TEP mapping entries it receives from a controller set (which received them from the NUMA nodes 780) in the first data store 755. The encapsulator 750 stores VM MAC to NUMA node mapping entries it creates in the second data store 757. In other embodiments, both mapping types are stored in a single data store of the host computer 705.

The physical network 775 delivers each encapsulated data message from the NUMA nodes set 780 to the host computer 705. The encapsulator 750 on that computer 705 removes the outer header and passes the data message to the virtual switch 710, which then delivers the data message to the destination VM executing on the host computer 705. In some embodiments, the physical network includes switches, routers and/or other forwarding elements, as well as wired and/or wireless connections between them.

When a data message sent from a NUMA node (i.e., from a machine executing on one of the NUMA nodes 780) to the host computer 705, a PNIC on that host computer passes the data message to an uplink port 755 of the virtual switch 710 on that host computer. The uplink port 755 then calls the overlay process (e.g., encapsulator 750) on that host computer, which then learns the source machine's MAC address behind the source TEPG identified in the encapsulating header (e.g., the GENEVE header).

This learning is different than the prior art learning, in which the source VM's MAC address behind the source TEP associated with this VM is learned, as opposed to the source TEPG associated with this VM. This learning is part of the data plane learning of the TEPG, which supplements the control plane publication of the TEPGs. For a responsive flow in the reverse direction, the virtual switch uses the learned MAC address behind a TEPG to select the TEPG for the destination, and then selects a destination TEP within the selected TEPG. In the reverse direction, the virtual switch 710 performs a hash computation in order to load balance the return traffic over the TEPs of the selected destination TEPG. Methods and systems regarding TEPs and TEP groups is further described in U.S. patent application Ser. No. 17/871,991, which is incorporated by reference in this application.

As mentioned above, the encapsulator 750 encapsulates the data messages of each flow with an encapsulating header (e.g., a GENEVE header) that stores the source and destination network addresses (e.g., L2-L4 addresses) of the selected TEP as the source TEP for the flow. Each encapsulating header in some embodiments is placed outside of the original header of the data message (i.e., encapsulates the original header without any modification to the original header). In some embodiments, the encapsulating header also includes the identifier of the selected source and destination TEPs for the flow. Alternatively, or conjunctively, the encapsulating header includes the identifier of the source and destination TEPGs for the flow.

The encapsulating header of the data message (more specifically, the network addresses of the source and destination TEPs used in the encapsulation header) allows the data message that is part of the logical overlay network to travel through the underlay network to reach its destinations (e.g., the destination host computers on which the destination machine is executing). In some embodiments, this data message is sent through a tunnel that is established (e.g., with keep-alive signaling) between the source and destination TEPs. In other embodiments, no tunnel is actively maintained between the source and destination TEPs, but the network addresses of these TEPs are used in encapsulation headers to allow the encapsulated data message to traverse between source and destination TEPs.

Figure 8:
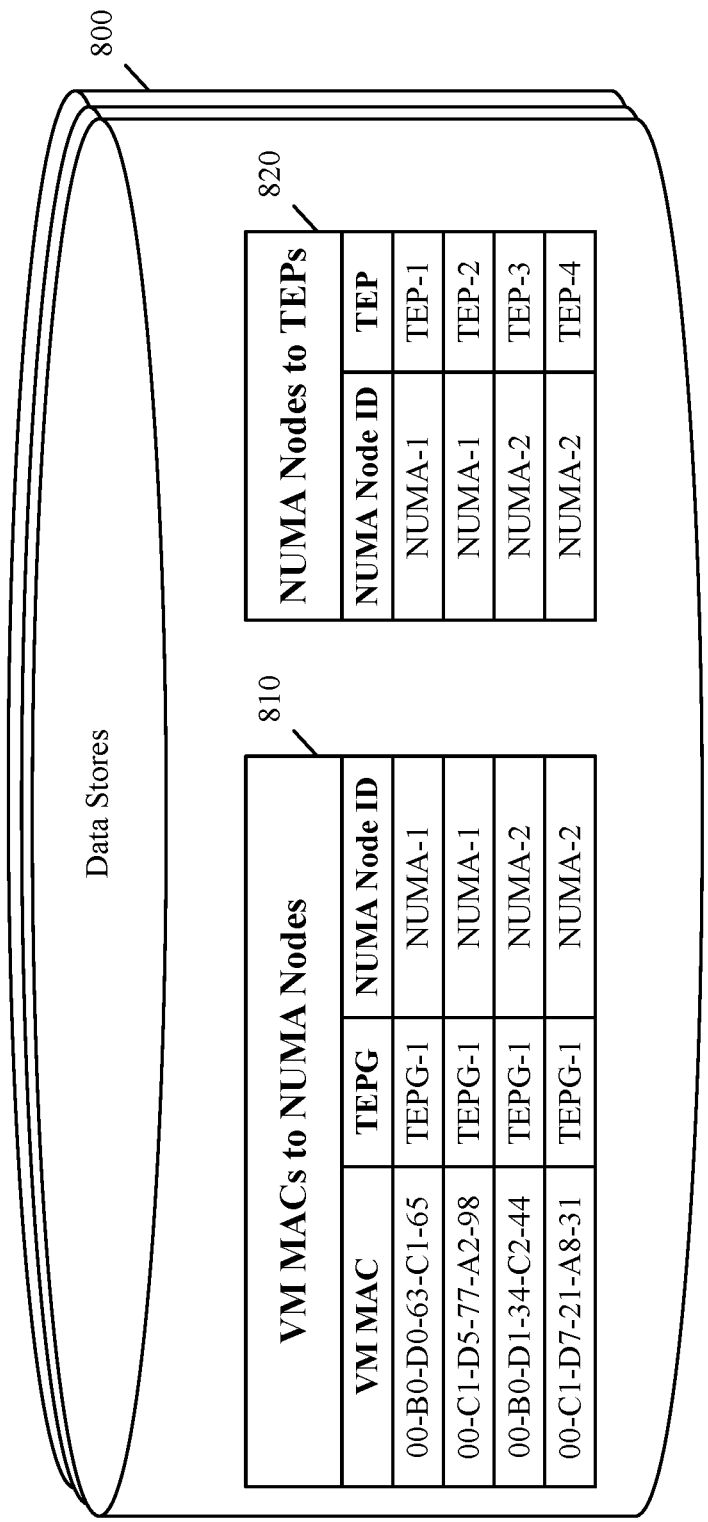
FIG. 8 illustrates an example set of data stores that stores different mappings for use by a software switch and/or an encapsulator of a host computer.

FIG. 8 illustrates an example set of data stores 800 that stores different mappings for use by a software switch and/or an encapsulator of a host computer. In this example, the data store set 800 stores a first table 810 mapping VM MAC addresses to TEPGs and to NUMA nodes. As shown by this table 810, the first and second VM MAC addresses are associated with a first NUMA node with ID NUMA-1. This indicates that these two VMs are executing on the first NUMA node. The third and fourth VM MAC addresses are associated with a second NUMA node with ID NUMA-2. This indicates that these two VMs are executing on the second NUMA node. All of the VMs are associated with a same TEPG 1. In other embodiments, the table 810 only specifies the VM MAC and its associated NUMA node ID (i.e., the associated TEPG is not specified). Using this table 810, a software switch or encapsulator can determine which NUMA node to send a data message destined to a particular VM.

The data store set 800 also stores a second table 820 mapping NUMA node IDs to TEP IDs. As shown by this table 820, the first NUMA node with ID NUMA-1 is associated with TEPS TEP-1 and TEP-2. The second NUMA node with ID NUMA-2 is associated with TEPs TEP-3 and TEP-4. Using this table 820, the software switch or encapsulator can encapsulate a data message with a TEP associated with the NUMA node executing the destination VM.

In some embodiments, the data store set 800 also stores a third table (not shown) that maps TEPGs to TEPs. In such embodiments, the table specifies each TEPG of the SDN and all of the information for that TEPG. For example, for a particular TEPG of the SDN, the third table in some embodiments specifies each TEP that is a member of the particular TEPG, all information about the TEP members of the particular TEPG, and the properties of the TEP members of the particular TEPG. In such embodiments, this type of table for a NUMA-based server is generated by the NUMA-based server and provided to the controller to distribute to other hosts of the SDN.

Figure 9:
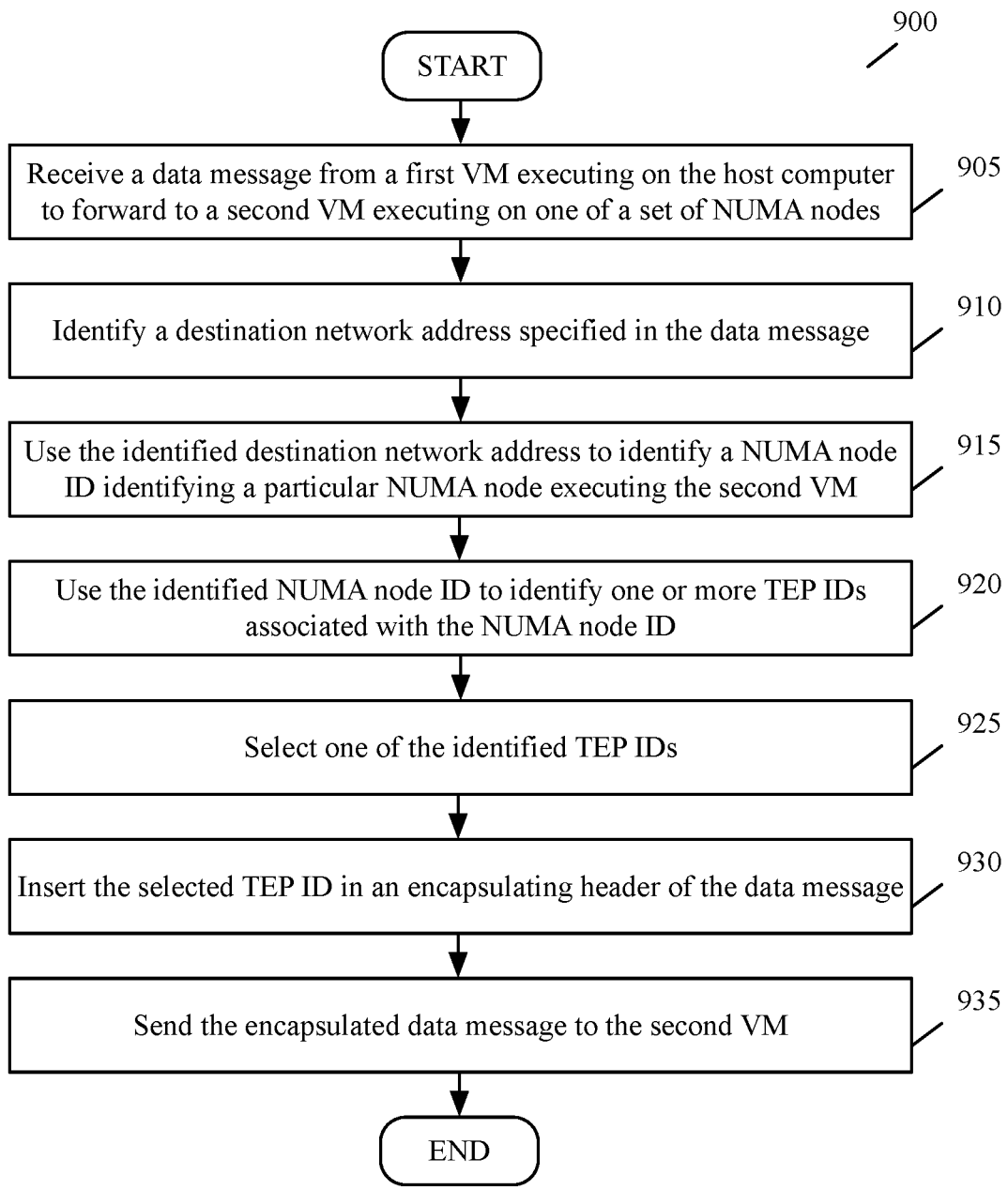
FIG. 9 conceptually illustrates a process of some embodiments for sending flows to a set of NUMA nodes of an SDN.

FIG. 9 conceptually illustrates a process 900 of some embodiments for sending flows to a set of NUMA nodes of an SDN. The process 900 is performed in some embodiments by a software switch (also referred to as a virtual switch) executing on a host computer in the SDN. The SDN includes in some embodiments one or more other host computers, each executing its own software switch. The set of NUMA nodes executes on one NUMA-based server (e.g., one host computer).

The software switch in some embodiments stores, in a local data store of the host computer, a table that includes NUMA node to TEP mapping entries. This table is generated by at least one of the set of NUMA nodes and is provided to the controller of the SDN to provide it to the software switch. The steps of the process 900 are performed in some embodiments in the order described below. In other embodiments, the steps of the process 900 are performed in a different order than described below. Still, in other embodiments, one or more of the steps of the process 900 are performed simultaneously.

The process 900 begins by receiving (at 905) a data message from a first VM executing on the host computer to forward to a second VM executing on one of the set of NUMA nodes. The software switch receives, from the first VM which is the source VM, the data message to send it to its destination. In some embodiments, the software switch receives the data message through a VNIC of the first VM.

Next, the process 900 identifies (at 910) a destination network address specified in the data message. In some embodiments, the software switch examines a header of the data message to identify the destination MAC address of the data message, which is the MAC address of the second VM.

At 915, the process 900 uses the identified destination network address to identify a NUMA node ID identifying a particular NUMA node executing the second VM. Using a table mapping VM network addresses to NUMA node IDs, the software switch performs a lookup operation to match the destination MAC address of the data message with an entry in the table. After identifying this entry, the software switch examines the entry to identify the associated NUMA node ID. After identifying this, the software switch knows which NUMA node executes the second VM.

Then, the process 900 uses (at 920) the identified NUMA node ID to identify one or more TEP IDs associated with the NUMA node ID. Using another table mapping NUMA node IDs to TEP IDs, the software switch performs another lookup operation to match the identified NUMA node ID with one or more entries in the table. After identifying one or more entries for the NUMA node ID, the software switch examines them to identify one or more associated TEP IDs. The associated TEP IDs correspond to one or more TEPs of one or more NICs (e.g., one or more PNICs) connected to the particular NUMA node. After identifying these TEP(s), the software switch knows which TEPs it can send the data message to in order to send it to the NUMA node executing the second VM.

At 925, the process 900 selects one of the identified TEP IDs. In some embodiments, the NUMA node executing the second VM is connected to one or more NICs that each have one or more TEPs (with each TEP associated with a different uplink interface). As such, the software switch selects one of these TEPs, from the identified set of TEP IDs, for forwarding the data message. In some embodiments, the software switch selects one of the identified TEP IDs by performing a load balancing operation. In other embodiments, the software switch selects one of the identified TEP IDs non-deterministically.

Then, the process 900 inserts (at 930) the selected TEP ID in an encapsulating header of the data message. To send the data message to the TEP identified by the selected TEP ID, the software switch specifies the selected TEP ID as the destination TEP of the data message in an encapsulating header.

Lastly, the process 900 sends (at 935) the encapsulated data message to the second VM. After encapsulating the data message with the selected destination TEP, the software switch sends it to the destination TEP. In some embodiments, the software switch sends the encapsulated data message to a NIC of the host computer, which forwards it to the NUMA node executing the second VM. In some of these embodiments, the encapsulated data message traverses one or more intervening switches (e.g., ToR switches) before reaching the NUMA node executing the second VM. After sending the encapsulated data message, the process 900 ends.

As described above, a software switch of the host computer in some embodiments performs the lookup operations and encapsulation operation to send the data message to the second VM. In other embodiments, the software switch receives the data message from the first VM and provides the data message to an encapsulator of the host computer to perform the lookup operations and encapsulation operation. Then, after the encapsulator performs steps 910-930, it provides the encapsulated data message back to the software switch, which sends the encapsulated data message to the second VM.

Figure 10:
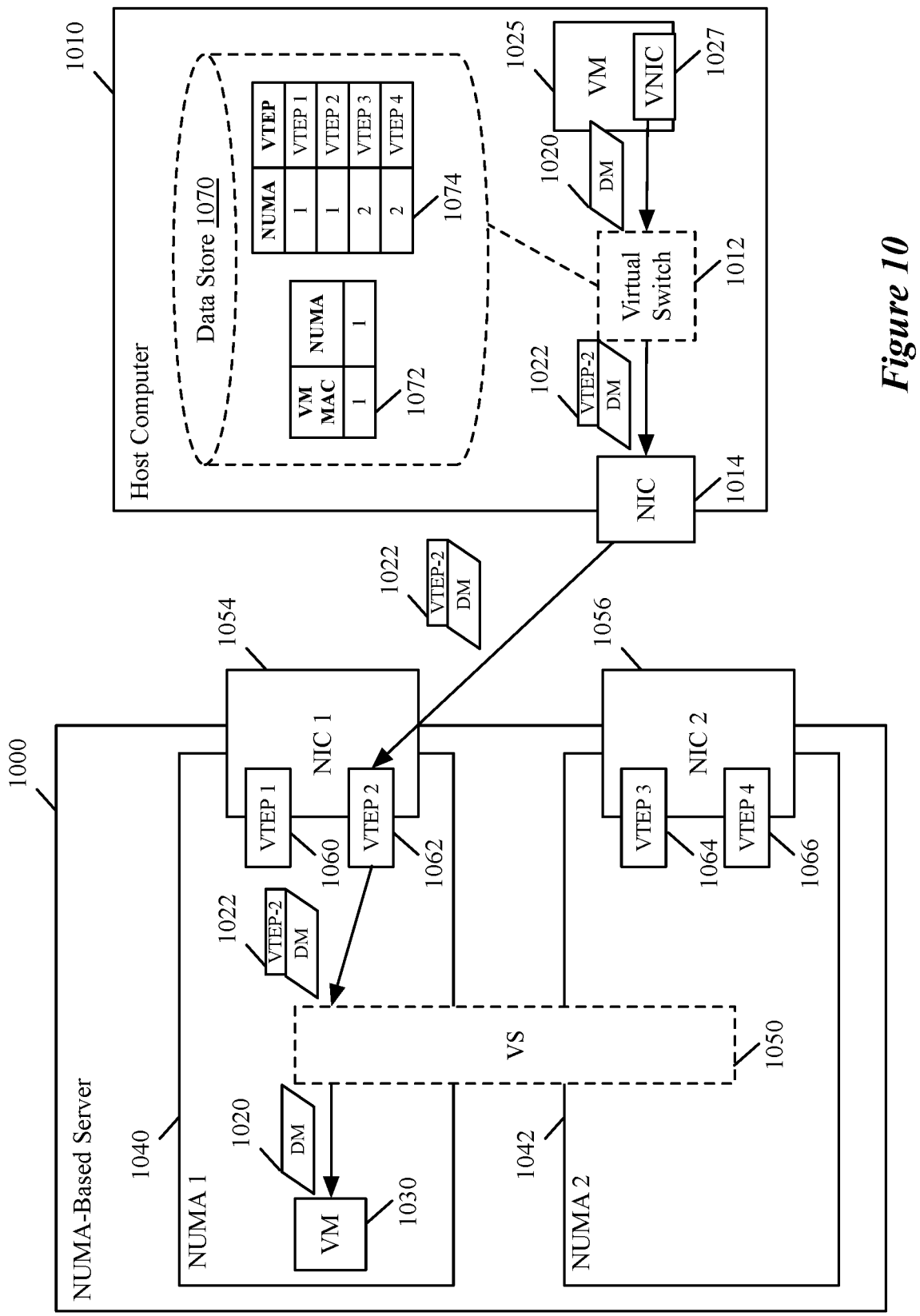
FIG. 10 illustrates an example NUMA-based server that exchanges flows with a host computer.

FIG. 10 illustrates an example NUMA-based server 1000 that exchanges data messages with a host computer 1010. In this example, the host computer 1010 is sending a data message 1020 from a source VM 1025 to a destination VM 1030 executing on a first NUMA node 1040 of the NUMA-based server 1000. The host computer 1010 also includes a virtual switch 1012 and a NIC 1014 to connect to the NUMA-based server 1000.

The first NUMA node 1040 is associated with a NIC 1054 and two VTEPs 1060-1062. The NUMA-based server 1000 also includes a second NUMA node 1042, which is associated with a NIC 1056 and two VTEPs 1064-1066. In some embodiments, the VTEPs 1060-1066 are all members of a VTEP group. A virtual switch 1050 of the NUMA-based server 1000 spans both of the NUMA nodes 1040-1042.

The source VM 1025 sends a data message 1020, through a VNIC 1027 of the VM 1025, to the virtual switch 1012. The virtual switch 1012 performs a lookup operation in its local data store 1070. This lookup operation compares the destination MAC address of the data message 1020 to a VM MAC to NUMA node table 1072 in order to identify which NUMA node 1040 or 1042 executes the destination VM 1030. The table 1072 is in some embodiments a VDL2 bridge table.

In some embodiments, the table 1072 also specifies, for each VM MAC, its associated TEPG (not shown). In this example, all of the VTEPs 1062-1068 are members of one TEPG, so the table 1072 would specify, for each VM (including VM 1030), this TEPG.

After identifying the first NUMA node 1040 as the node executing the destination VM 1030, the virtual switch 1012 performs a second lookup operation in the data store 1070. This lookup operation compares the identified NUMA node ID to a NUMA node to VTEP table 1074 in order to identify the VTEPs associated with the NUMA node 1040. In this example, the virtual switch 1012 determines, using the table 1074, that the first NUMA node 1040 executing the destination VM 1030 is associated with VTEPs 1060-1062, so the virtual switch 1012 can send the data message 1020 to one of these VTEPs to reach the destination VM 1030.

After identifying the VTEPs 1060-1062 associated with the first NUMA node 1040, the virtual switch 1012 selects one of the VTEPs to send the data message 1020. In some embodiments, the virtual switch 1012 performs a load balancing operation to select one of the VTEPs. In other embodiments, the virtual switch 1012 performs a non-deterministic operation to select one of the VTEPs. Any suitable method for selecting a VTEP may be used.

In this example, the virtual switch 1012 has selected VTEP 1062 to which to send the data message 1020, however, in other embodiments, the virtual switch 1012 can select the VTEP 1060 instead. After selecting the VTEP 1062, the virtual switch 1012 encapsulates the data message 1020 with an encapsulating header that specifies the TEP ID of the selected VTEP 1062. After encapsulating the data message 1020, the virtual switch 1012 sends the encapsulated data message 1022 to the NIC 1014 of the host computer 1010, which forwards it to the VTEP 1062 specified in the encapsulating header.

The encapsulated data message 1022, after being received at the selected VTEP 1062 of the NIC 1054, is received at the virtual switch 1050 of the NUMA node 1040. After receiving the encapsulated data message 1022, the virtual switch 1050 removes the encapsulating header and provides the data message 1020 to the destination VM 1030. By only considering the VTEPs 1060-1062 associated with the NUMA node 1040 on which the destination VM 1030 executes, the virtual switch 1012 of the host computer 1010 avoids an increase in latency (which would occur if the data message were sent to the other NUMA node 1042 before reaching the destination NUMA node 1040).

While the virtual switch 1012 is described above as performing the lookup operations in the data store 1070 and performing the encapsulation operation, in other embodiments, one or more of these operations are performed by an encapsulator of the host computer 1010.

Figure 11:
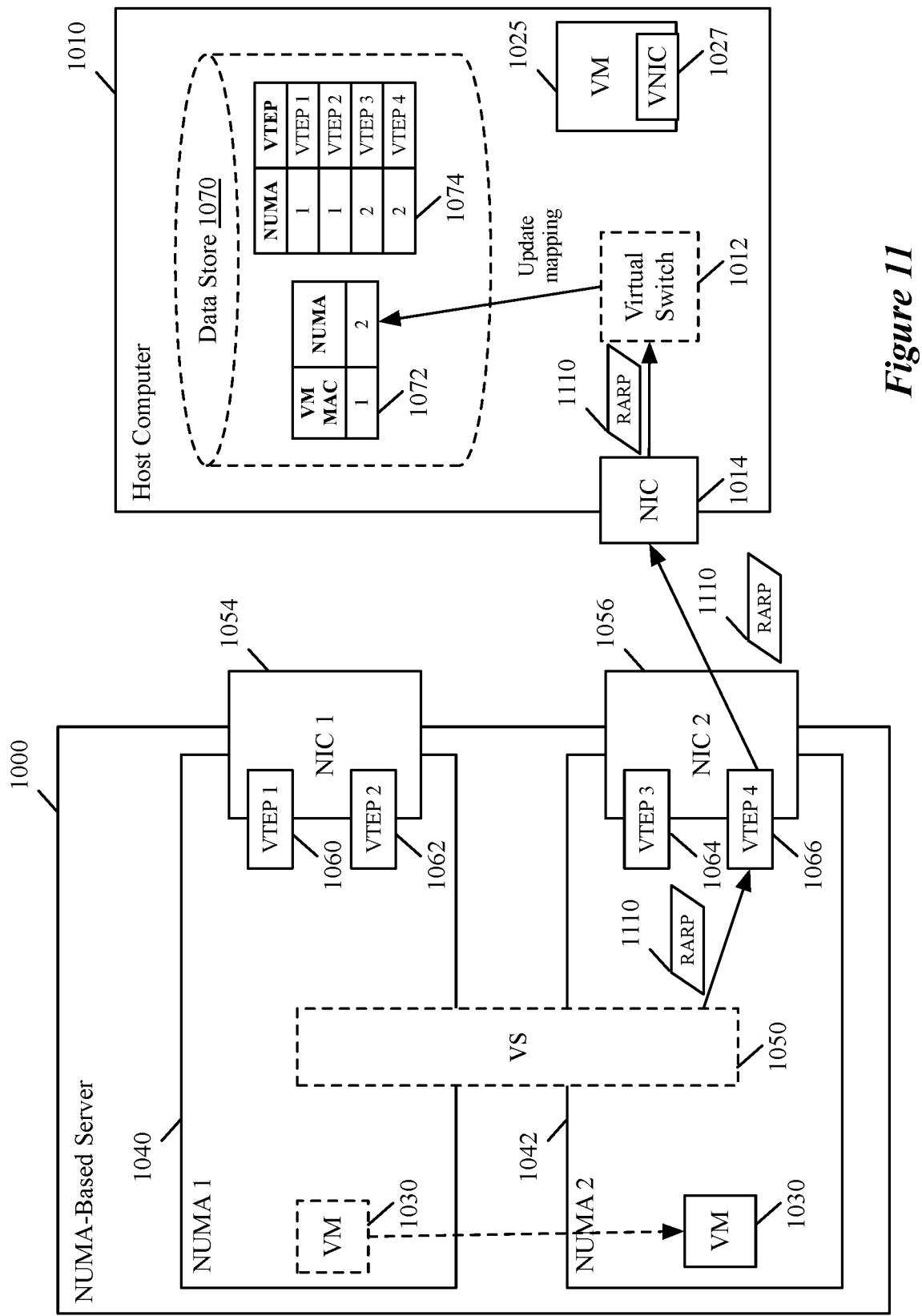
FIG. 11 illustrates an example VM migrating from a first NUMA node to a second NUMA node.

In some embodiments, when a VM of a NUMA node migrates to another NUMA node, host computers that communicate with the VM need to be notified of the migration in order to maintain the correct VM MAC to NUMA node mapping that is used in forwarding data messages to the VM. FIG. 11 illustrates the VM 1030 being migrated from the first NUMA node 1040 to the second NUMA node 1042. As shown, when the VM 1030 migrates from the first NUMA node 1040 to the second NUMA node 1042, the virtual switch 1050 will send a Reverse Address Resolution Protocol (RARP) message 1110 to the host computer 1010. In some embodiments, the RARP message 1110 specifies the network address (e.g., MAC address) of the VM 1030 and an identifier of the destination NUMA node 1042 (e.g., the NUMA node ID, a network address of the NUMA node such as an IP address or MAC address). In this example, the virtual switch 1050 sends the RARP message 1110 out of the VTEP 1066 of the NIC 1056 of the NUMA node 1042, however the virtual switch 1050 can send the RARP message 1110 out of any of the VTEPs associated with the NUMA node 1042.

The RARP message 1110 is sent from the NIC 1056 of the NUMA node 1042 to the NIC 1014 of the host computer 1010, which provides it to the virtual switch 1012. After receiving the RARP message 1110, the virtual switch 1012 updates the mapping for this VM 1030 in the table 1072. In embodiments where the table 1072 also specifies the VM's associated TEPG, this information in the mapping remains unchanged, as both the original VTEPs 1062-1064 associated with the VM 1030 and the new VTEPs 1066-1068 associated with the VM 1030 are members of the same TEPG.

After updating the mapping, the virtual switch 1012 can send data message flows, destined for the VM 1030, to the NUMA node 1042 which now executes the VM 1030 and avoid increases in latency.

By associating VMs with NUMA nodes and sending RARP messages to host computers in the event of a VM migration, these embodiments avoid a control plane "churn," which would require the need for the controller set of the NUMA nodes and host computers to perform additional operations.

While NUMA nodes are connected by processor interconnects and can exchange data with each other, doing so for data message flows increases the latency of these flows. To avoid increases in latency, NUMA affinity of TEPs is reported to host computers of the same network as the NUMA nodes. By reporting this information, remote host computers are aware of which local TEPs belong to which NUMA node. When receiving data messages from the local TEPs of a NUMA node, the remote host computers will store the NUMA node's ID in a table (e.g., a VDL2 bridge table).

When deciding to send data messages back to the NUMA node, the remote host computers perform hash calculations, but only select from the TEPs belonging to that NUMA node. Because of this, the remote host computers will be able to ensure that a NUMA node will receive data messages only through the uplinks belonging to that NUMA node. This allows for (1) a minimum latency for data messages exchanged with NUMA nodes, (2) receiving and transmitting threads and data messages that follow the VM, and (3) no control plane churning during VM migration between NUMA nodes.

Figure 12:
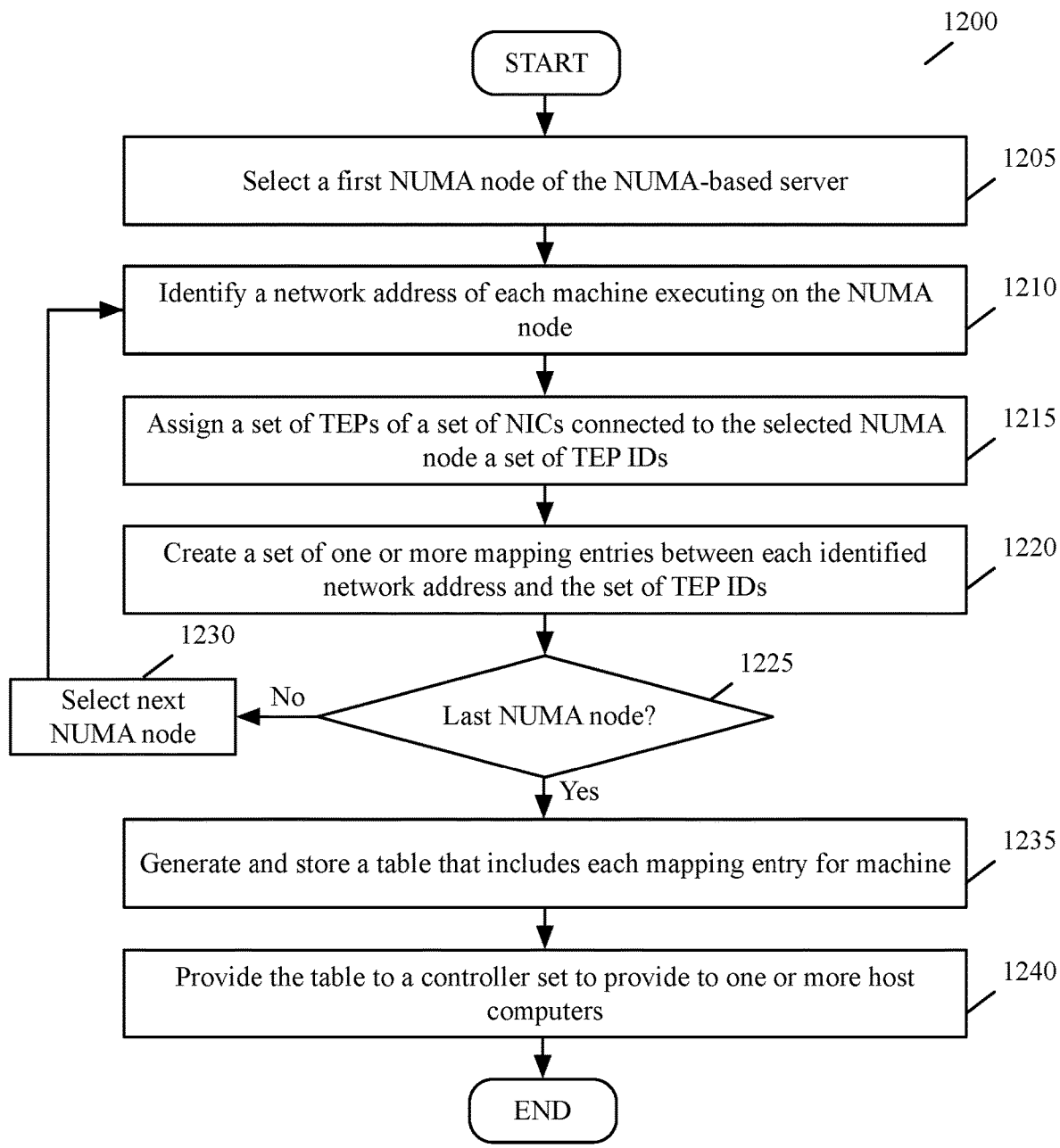
FIG. 12 conceptually illustrates a process of some embodiments for generating a NUMA node to TEPG mapping table.

As described above, some embodiments associate (1) NUMA nodes with TEPs associated with the NUMA nodes' connected NICs and (2) machines executing on the NUMA nodes with the NUMA nodes in order to avoid traffic sent to and from external host computers being exchanged between NUMA nodes. To avoid issue, other embodiments identify NUMA node associations to NICs and create TEPGs such that all members of a particular TEP group belong to a same NUMA node. FIG. 12 conceptually illustrates a process 1200 of some embodiments for generating a NUMA node to TEPG mapping table. This process 1200 is performed in some embodiments by a virtual or software switch spanning a set of NUMA nodes of a NUMA-based server, host computer, or appliance. In some of these embodiments, the virtual switch is a DVS implemented by different instances each executing on the different NUMA nodes. Alternatively, the virtual switch executes along with the NUMA nodes on the same server executing the NUMA nodes. The process 1200 will be described in relation to the components of FIG. 5, however one of ordinary skill would understand that the process 1200 can be performed using other configurations of a NUMA-based server 500.

In some embodiments, the process 1200 is performed after the set of NUMA nodes 512-514 is initially configured by a set of one or more controllers 505 (i.e., after the set of NUMA nodes 512-514 has been instantiated). The controller set 505 configures an SDN that includes the set of NUMA nodes 512-514. In other embodiments, the process 1200 is performed after the software switch 536 is directed to do so by the set of controllers 505 configuring the SDN and the set of NUMA nodes 512-514.

The process 1200 begins by selecting (at 1205) a first NUMA node of the NUMA-based server. The software switch 536 of some embodiments needs to perform each of the steps 1210-1220 for each NUMA node 512-514 of the NUMA-based server 500. As such, the software switch 536 selects a first NUMA node (e.g., NUMA node 512) of the NUMA-based server 505 to perform the steps 1210-1220.

Next, the process 1200 identifies (at 1210) a network address of each machine executing on the NUMA node. The software switch 536 of some embodiments, after selecting the first NUMA node 512, identifies the network addresses for each machine 542 executing on the selected NUMA node 512. In some embodiments, the software switch 536 examines configuration information (e.g., which stored at the NUMA-based server 500 or which is requested from the controller set 505) used to configure the machines 542. The identified network addresses are in some embodiments the MAC addresses of the machines 542.

At 1215, the process 1200 assigns a set of TEPs of a set of NICs connected to the selected NUMA node a set of TEP IDs. The software switch 536 of some embodiments identifies each NIC 552 (i.e., each PNIC) connected to the selected NUMA node 512 and identifies each TEP 562-564 of each identified NIC 552 to assign each TEP a unique TEP ID. The TEP ID can be a numerical ID, such as TEP-1 through TEP-N. Alternatively, the TEP ID can be a UUID or a GUID. Any suitable identifier for a TEP can be used. In some embodiments, the software switch 536 also assigns the set of TEPs 562-564 of the NICs 552 connected to the selected NUMA node 512 a TEPG ID. This TEPG ID can also be a numerical ID, UUID, GUID, or any suitable identifier.

Then, the process 1200 creates (at 1220) a set of one or more mapping entries between each identified network address and the set of TEP IDs. To associate the machines 542 with each TEP 562-564 associated with the NUMA node 512 running the machines 542, the software switch 536 generates one or more mapping entries to associate the machines' network addresses with the set of TEP IDs. In some embodiments, the software switch 536 creates a different mapping entry for each machine 542 and each TEP ID, such that each mapping entry specifies a different machine network address and TEP ID pair. In such embodiments, the software switch 536 creates as many mapping entries for each of the machines 542 node as there are TEPs 562-564 associated with the NUMA node 512. In other embodiments, the software switch 536 creates a single mapping entry for each machine 542, such that a single mapping entry specifies a different machine's network address and each of the set of TEP IDs.

Next, the process 1200 determines (at 1225) whether the selected NUMA node is the last NUMA node. To ensure that all NUMA nodes 512-514 of the NUMA-based server 500 has mapping entries created for their machines 542-544, the software switch 536 determines whether selected NUMA node (e.g., NUMA node 512) is the last NUMA node for which it has to create one or more mapping entries. If the process 1200 determines that the selected NUMA node is not the last NUMA node (i.e., that one or more NUMA nodes need to have mapping entries created for them), the process 1200 selects (at 1230) a next NUMA node and returns to step 1210.

If the process 1200 determines that the selected NUMA node is the last NUMA node (i.e., that all NUMA nodes 512-514 have mapping entries created for their machines 542-544), the process 1200 generates (at 1235) and stores a table that includes each mapping entry for each machine. After creating mapping entries for each machine 542-544 of each NUMA node 512-514, the software switch 536 creates the table to specify each created mapping entry. Then, the software switch 505 stores the table in a local data store (not shown) to maintain mappings between each machine 542-544 and each TEP 562-568 of the NUMA-based server 500. In some embodiments, when the software switch 536 also assigns each set of TEPs a TEPG ID, the software switch 536 generates two tables. A first table maps the machines' network addresses to the TEPG IDs, and a second table maps the TEPG IDs to the TEP IDs.

Lastly, the process 1200 provides (at 1240) the table to the controller set that configures the NUMA-based server to provide the table to one or more host computers. The software switch 536 provides the table to the controller set 505 so that the controller set can provide it to host computers (not shown) that may communicate with the NUMA-based server 505. In some embodiments, the controller set 505 provides the table to each other host computer in the SDN that includes the NUMA-based server 500. In other embodiments, the controller set 505 provides the table to a subset of host computers in the SDN that the controller set 505 knows communicates with the NUMA-based server 500.

In embodiments where the software switch 536 creates multiple tables, the software switch 536 provides all of the created tables to the controller set 505 to provide to host computers of the SDN. After providing the table to the controller set, the process 1200 ends. In some embodiments, each of the TEPs 562-568 of each created TEPG is associated with one NUMA node. In such embodiments, no TEP is a member of multiple TEPGs.

FIGS. 13A-B illustrate example tables 1310-1330 that can be generated by a software switch (also referred to as a virtual switch) of a NUMA-based server to associate machine network addresses to TEPs. FIG. 13A illustrates an example first table 1310 that maps VM MAC addresses to TEP IDs. In this example, the table 1310 specifies, for each entry, a different VM MAC address and a set of TEP IDs associated with the NUMA node executing the VM. For example, the first entry of the table 1310 specifies a MAC address of a particular VM and two TEP IDs (TEP1 and TEP2) associated with the particular VM.

FIG. 13B illustrates an example second table 1320 that maps VM MAC addresses to TEPG IDs and a third table 1330 that maps TEPG IDs to TEP IDs. In this example, the second table 1320 specifies, for each entry, a different VM MAC address and a TEPG ID for the TEPG associated with the NUMA node executing the VM. The third table 1330 specifies, for each entry, a different TEPG ID and a set of TEP IDs identifying the TEPs that are members of that TEPG. For example, the first entry of the table 1320 specifies a MAC address of a particular VM and a TEPG ID, and the first entry of the table 1330 specifies the same TEPG ID and a set of TEP IDs associated with that TEPG ID.

In some embodiments, the table 1330 specifies each TEPG of the SDN and all of the information for that TEPG. For example, for a particular TEPG of the SDN, the table 1330 in some embodiments specifies each TEP that is a member of the particular TEPG, all information about the TEP members of the particular TEPG, and the properties of the TEP members of the particular TEPG. In such embodiments, this type of table for a NUMA-based server is generated by the NUMA-based server and provided to the controller to distribute to other hosts of the SDN.

Using the table 1310 or the tables 1320-1330, a software switch of a NUMA-based server can send a flow to another host computer specifying a source TEP associated with the source VM of the flow. Another host computer can use the table 1310 or the tables 1320-1330 to forward a flow to a destination VM executing on the NUMA-based server by encapsulating the flow with a destination TEP that is one of the TEPs associated with the destination VM.

Figure 14:
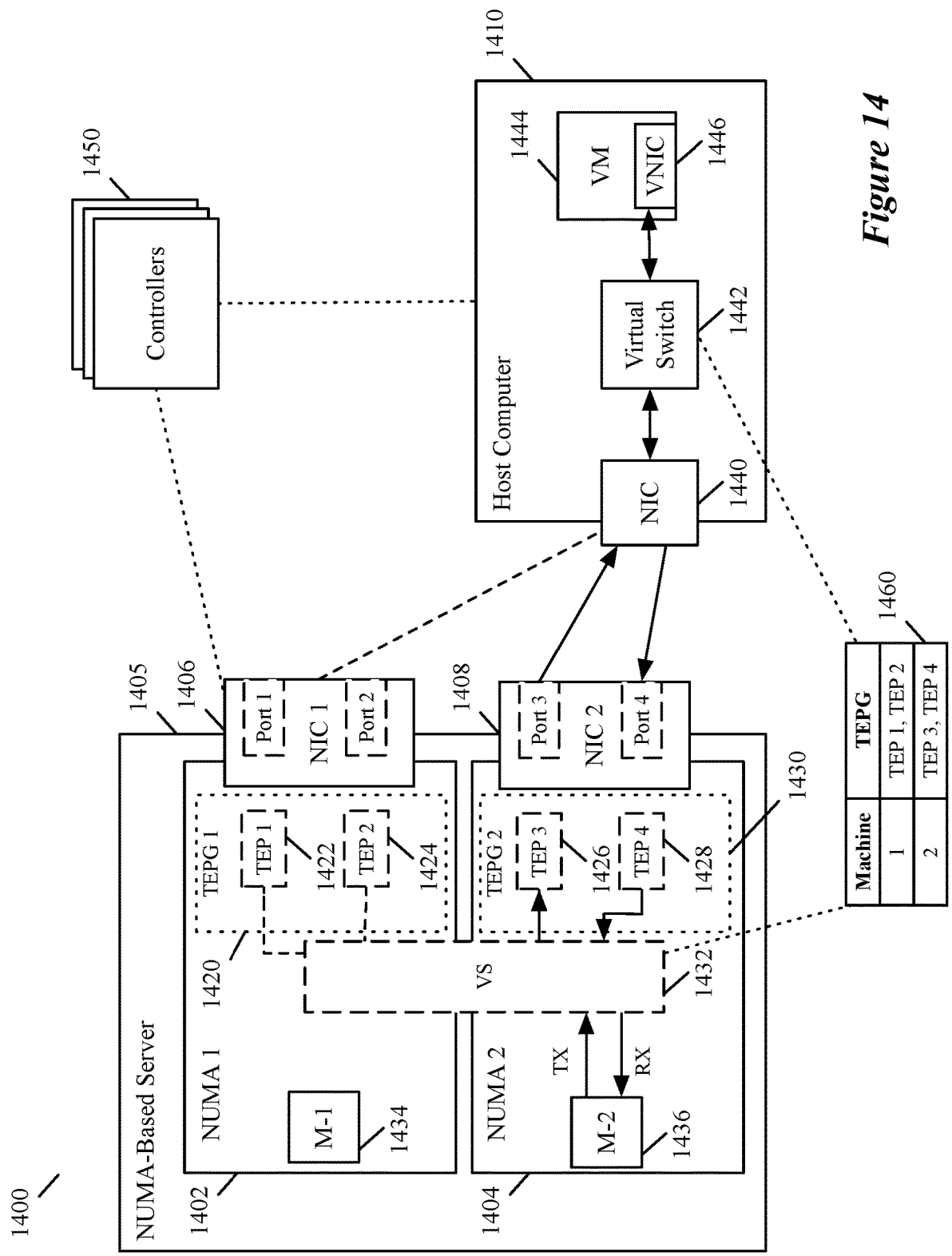
FIG. 14 illustrates an example SDN that includes a NUMA-based server that exchanges flows with a host computer based on different TEPGs of different NUMA nodes of the NUMA-based server.

FIG. 14 illustrates an example SDN 1400 including a NUMA-based server 1405 that exchanges data message flows with a host computer 1410 of the SDN 1400. The NUMA-based server 1405 includes a first NUMA node 1402 and a second NUMA node 1404. Each of the NUMA nodes 1402-1404 is respectively connected to a NIC 1406 and 1408 which allows the NUMA nodes 1402-1404 to connect to the host computer 1410. While only two NUMA nodes 1402-1404 are illustrated, the NUMA-based server 1405 can execute any number of NUMA nodes. While only one host computer 1410 is illustrated, the SDN 1400 can include any number of host computers that can communicate with each other and with the NUMA-based server 1405. The SDN 1400 can also include multiple NUMA-based servers. The NICs 1406-1408 are PNICs connected to the NUMA nodes 1402-1404.

Each of the NUMA nodes 1402-1404 has a set of one or more PCI slots. A first NIC 1406 is connected to the first NUMA node 1402, as it is inserted to a PCI slot associated with the NUMA node 1402. A second NIC 1408 is connected to the second NUMA node 1404, as it is inserted to a PCI slot associated with the NUMA node 1404.

The first NIC 1406 connected to the first NUMA node 1402 has two ports 1-2 and is associated with two TEPs 1422 and 1424, which are virtual tunnel endpoints of the NIC 1406 and are members of a first TEPG 1420. The second NIC 1408 connected to the second NUMA node 1404 also has two ports 3-4 and is associated with two other TEPs 1426 and 1428, which are virtual tunnel endpoints of the NIC 1408 and are members of a second TEPG 1430. In some embodiments, the TEPs 1422-1428 are respectively associated with the ports (i.e., uplink interfaces) of the NICs 1406-1408 such that one TEP is associated with one port of a NIC. In some embodiments, each of the TEPs 1422-1428 of each created TEPG 1420 and 1430 is associated with one NUMA node. In such embodiments, no TEP is a member of multiple TEPGs.

When a machine (e.g., VM 1434 or 1436 or another VM, container, or pod) wishes to send a data message to another machine in a different virtual network or on a different host, the TEP encapsulates the original Ethernet frame with the necessary overlay headers. This encapsulated data message can then be transmitted across the physical network. When the encapsulated data message arrives at its destination TEP, it is decapsulated and the original Ethernet frame is extracted. This allows the destination machine to receive the data message in its native format and ensures that the data message is correctly routed to the appropriate destination.

A VM 1436 also executes on the second NUMA node 1404. In some embodiments, the VM 1436 executes one or more applications that are the sources and destinations of data message flows exchanged with the host computer 1410. The first and second NUMA nodes 1402-1404 can execute any number of VMs or other machines, such as containers or pods.

The NUMA-based server 1400 executes a virtual switch 1432 that spans all of the NUMA nodes 1402-1404. For example, the virtual switch 1432 is in some embodiments a DVS implemented by different DVS instances executing on different NUMA nodes. The virtual switch 1432 (also referred to as a software switch, in some embodiments) exchanges the flows from machines (e.g., machines 1434-1436) executing on the NUMA nodes 1402-1404 with the NICs 1406-1408. For example, the virtual switch 1432 exchanges flows between the machine 1434 and the NIC 1406 and between the machine 1436 and the NIC 1408. The machines 1434-1436 can be VMs, containers, or pods.

The host computer 1410 includes a NIC 1440 to connect to the NICs 1406-1408 of the NUMA-based server 1405, a virtual switch 1442 (also referred to as a software switch, in some embodiments), and a machine 1444. The virtual switch 1442 receives data message flows from the VM 1444, through a VNIC 1446 of the VM 1444, and provides them to the NIC 1440 to forward to the NUMA-based server 1405. The virtual switch 1442 also receives flows from the NIC 1440, which received them from the NUMA-based server 1405 (e.g., from one of the machines 1434-1436), and provides them to the VM 1444 through the VNIC 1446.

The SDN 1400, the NUMA-based server 1405, and the host computer 1410 are configured by a set of one or more controllers 1450. For instance, the controller set 1450 in some embodiments instantiates and configures the machine 1434 on the first NUMA node 1402, the machine 1436 on the second NUMA node 1404, and the VM 1444 on the host computer 1410. The controller set 1450 in some embodiments is also responsible for defining and distributing forwarding rules among the NUMA-based server 1405 and the host computer 1410.

Because the SDN software of NUMA nodes can access the local memories of other NUMA nodes, flows exchanged between a NUMA node and an external source or destination (e.g., the machine 1434) can be sent through a NIC of another NUMA node. To avoid this, the virtual switches 1432 and 1442 use a table 1460 mapping the machines 1434-1436 to their associated TEPGs 1420 and 1430. In some embodiments, the table 1460 is generated by the virtual switch 1432 of the NUMA-based server 1405, which provides it to the controller set 1450 to provide to the virtual switch 1442 of the host computer 1410. Each host computer of the SDN 1400 uses the table 1460 when sending flows to and receiving flows from the NUMA-based server 1405.

As shown, the virtual switch 1432 uses the table 1460 to select one of the TEPs 1426 or 1428 of the second TEPG 1430 to send Tx flows from the machine 1436 to the VM 1444, as this TEPG 1430 is associated with the machine 1436. After selecting one of the TEPs (which is TEP 1426 in this example), the virtual switch 1432 encapsulates Tx flows with an encapsulating header specifying the third TEP 1426 as the source TEP before forwarding the Tx flows through port 3 of the second NIC 1408 to reach the VM 1444.

Similarly, the virtual switch 1442 uses the table 1460 to select one of the TEPs 1426 or 1428 of the second TEPG 1430 to send Rx flows from the VM 1444 to the machine 1436, as this TEPG 1430 is associated with the machine 1436. After selecting one of the TEPs (which is TEP 1428 in this example), the virtual switch 1442 encapsulates the Rx flows with an encapsulating header that specifies the selected destination TEP 1428, and forwards the encapsulated Rx flows to the NUMA-based server 1405. As such, the Rx and Tx flows are ensured to be forwarded through the NIC 1408 connected to the NUMA-based server 1405 executing the machine 1436, which ensures (1) a faster bandwidth as multiple ports of the NIC 1408 can be used for load balancing, and (2) no latency penalty as cross-NUMA ode data transfer is avoided. Similar operations can be performed for flows sent to and from machine 1434 to ensure that these flows are exchanged using the TEPG 1420 associated with the NIC 1406.

The virtual switches 1432 and 1442 increase the throughput of the Tx and Rx flows by load balancing the flows across all available ports of all NICs (i.e., NIC 1408) associated with the NUMA node 1404 executing the VM 1436. This is unlike other embodiments, where all traffic to and from the VM 1436 can be sent through one port of one NIC 1406, which can cause congestion and bandwidth issues when it has to contest with other traffic (e.g., another machine (not shown) executing on one of the NUMA nodes 1402-1404) that is also sent through the same NIC 1406.

The example of FIG. 14 considers the latency implications of cross NUMA NIC usage. More specifically, the example of FIG. 14 uses load balancing to determine which NIC port to send traffic to and from the VM 1436, but also ensures that no latency regressions occur. As such, the traffic sent to and from the VM 1436 are load balanced across only the TEPs associated with the NIC 1408 connected to the NUMA node 1404 executing the VM 1436 (i.e., no TEPs associated with other NUMA nodes, such as NUMA node 1402, are considered). By doing so, the latency of the flows is not impacted.

Figure 15:
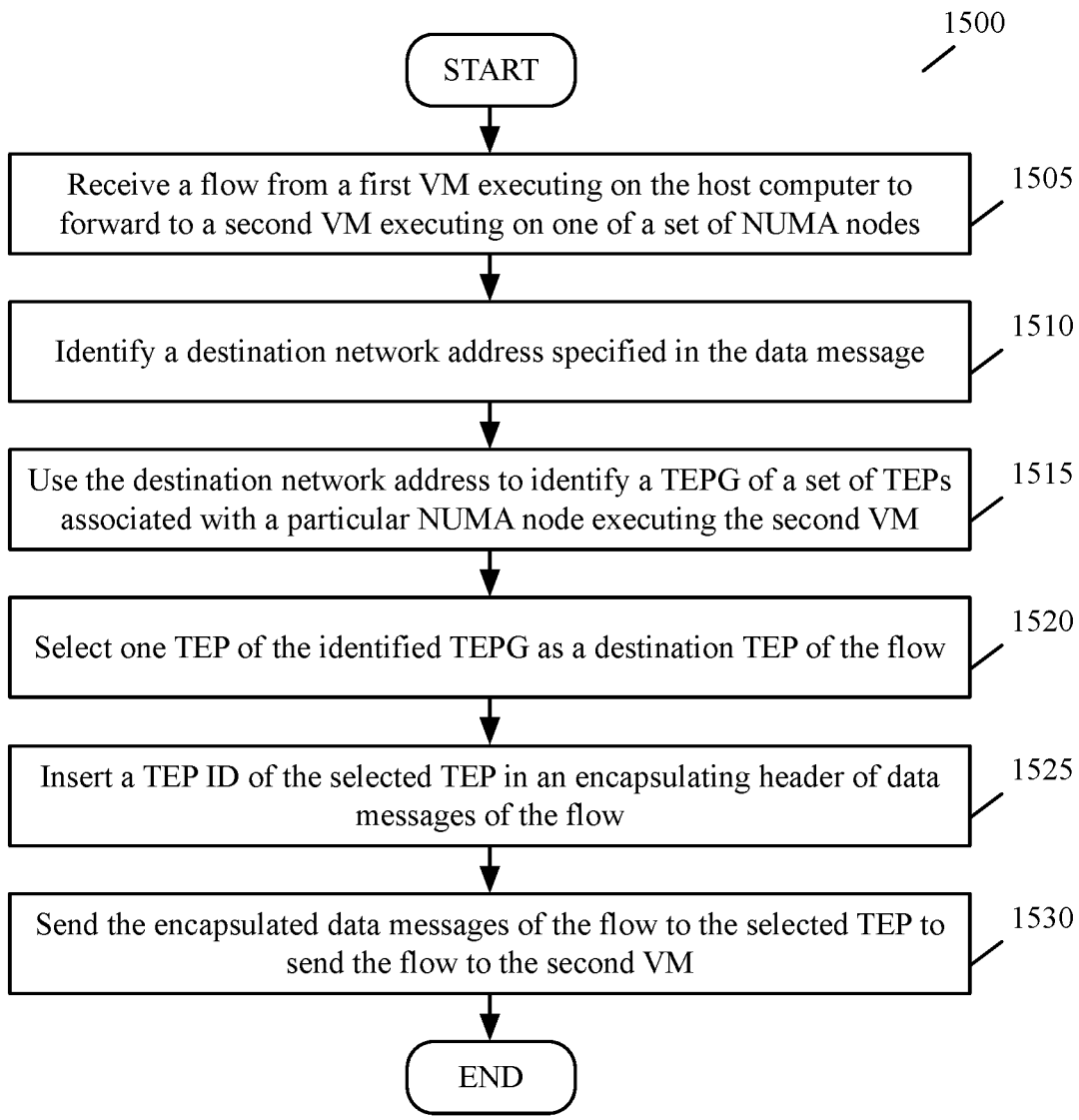
FIG. 15 conceptually illustrates a process of some embodiments for sending flows to a set of NUMA nodes based on different TEPGs associated with the NUMA nodes.

FIG. 15 conceptually illustrates a process 1500 of some embodiments for sending flows to a set of NUMA nodes of an SDN. The process 1500 is performed in some embodiments by a software switch (also referred to as a virtual switch) executing on a host computer in the SDN (such as the virtual switch 710 of FIG. 7 or 1442 of FIG. 14). The SDN includes in some embodiments one or more other host computers, each executing its own software switch. The set of NUMA nodes executes on one NUMA-based server (e.g., one host computer).

The software switch in some embodiments stores, in a local data store of the host computer, a table that includes machine network address to TEP mapping entries. This table is generated by a software switch of the set of NUMA nodes and is provided to the controller of the SDN to provide it to the software switch of the host computer. The steps of the process 1500 are performed in some embodiments in the order described below. In other embodiments, the steps of the process 1500 are performed in a different order than described below. Still, in other embodiments, one or more of the steps of the process 1500 are performed simultaneously.

The process 1500 begins by receiving (at 1505) a data message from a first VM executing on the host computer to forward to a second VM executing on one of the set of NUMA nodes. The software switch receives, from the first VM which is the source VM, the data message to send it to its destination. In some embodiments, the software switch receives the data message through a VNIC of the first VM.

Next, the process 1500 identifies (at 1510) a destination network address specified in the data message. In some embodiments, the software switch examines a header of the data message to identify the destination MAC address of the data message, which is the MAC address of the second VM.

At 1515, the process 1500 uses the identified destination network address to identify a TEPG of a set of TEPs associated with a particular NUMA node executing the second VM.

Using a table mapping VM network addresses to TEPGs, the software switch performs a lookup operation to match the destination MAC address of the data message with an entry in the table. After identifying this entry, the software switch examines the entry to identify the associated TEPG. In such embodiments, the entry specifies the TEP IDs of the set of TEPs of the TEPG. After identifying this, the software switch knows which set of TEPs is associated with the second VM (i.e., which set of TEPs is associated with the particular NUMA node executing the second VM).

In other embodiments, the software switch performs two lookup operations in two different tables to identify the set of TEPs associated with the second VM. The first lookup operation in a first table uses the identified destination network address to identify a TEPG ID identifying the TEPG associated with the second VM. The second lookup operation in the second table uses the identified TEPG ID to identify a set of TEP IDs identifying the TEPs that are members of the identified TEPG.

At 1520, the process 1500 selects one TEP of the identified TEPG as a destination TEP of the flow. In some embodiments, the NUMA node executing the second VM is connected to one or more NICs that each have one or more TEPs (with each TEP associated with a different uplink interface). As such, the software switch selects one of these TEPs, from the identified set of TEP IDs of the identified TEPG, for forwarding the flow. In some embodiments, the software switch selects one of the identified TEP IDs by performing a load balancing operation. In other embodiments, the software switch selects one of the identified TEP IDs non-deterministically.

Then, the process 1500 inserts (at 1525) a TEP ID of the selected TEP in an encapsulating header of data messages of the flow. To send the data message flow to the TEP identified by the selected TEP ID, the software switch specifies the selected TEP ID as the destination TEP of the data messages in an encapsulating header.

Lastly, the process 1500 sends (at 1530) the encapsulated data messages of the flow to the selected TEP to send the flow to the second VM. After encapsulating the data messages of the flow with the selected destination TEP, the software switch sends the encapsulated data messages to the destination TEP. In some embodiments, the software switch sends the encapsulated data messages to a NIC of the host computer, which forwards it to the NUMA node executing the second VM (i.e., to the NIC that is associated with the selected TEP and is connected to the NUMA node executing the second VM). In some of these embodiments, the encapsulated data messages traverse one or more intervening switches (e.g., ToR switches) before reaching the NUMA node executing the second VM. After sending the encapsulated data messages, the process 1500 ends.

As described above, a software switch of the host computer in some embodiments performs one or more lookup operations and an encapsulation operation to send the flow to the second VM. In other embodiments, the software switch receives the flow from the first VM and provides the flow to an encapsulator of the host computer to perform the one or more lookup operations and the encapsulation operation. Then, after the encapsulator performs steps 1510-1525, the encapsulator provides the encapsulated data messages back to the software switch, which sends the encapsulated data messages to the selected TEP to reach the second VM.

Figure 16:
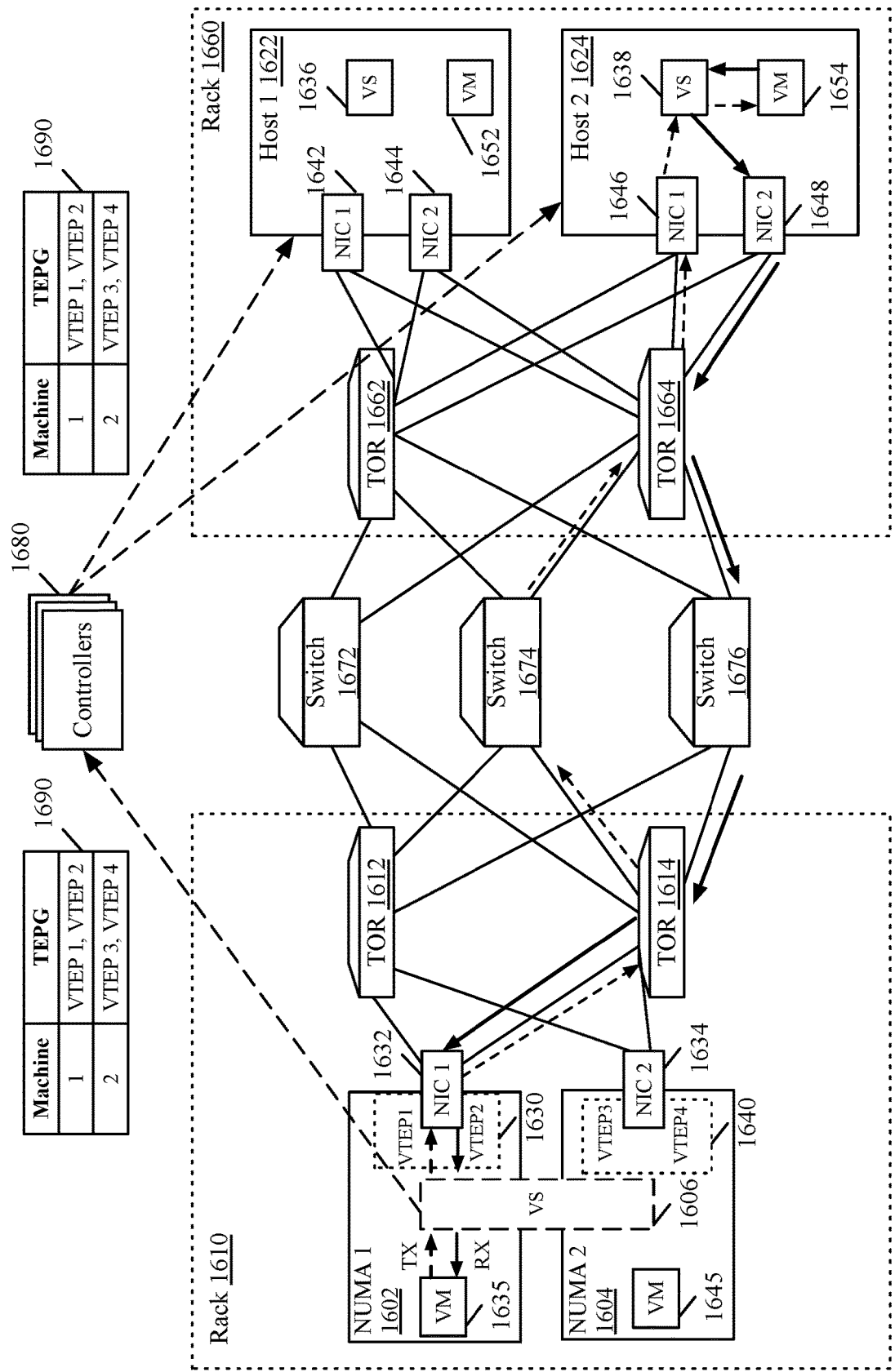
FIG. 16 illustrates an example set of NUMA nodes that communicates with a set of host computers based on TEPGs.

FIG. 16 illustrates an example set of NUMA nodes 1602-1604 that communicates with a set of host computers 1622-1624. A virtual switch 1606 spans the NUMA nodes 1602-1604 and is connected to NICs 1632-1634 (which are PNICs). The first NIC 1632 connected to the first NUMA node 1602 is associated with a first TEPG 1630 that includes two VTEPs, VTEP1 and VTEP2. The second NIC 1634 connected to the second NUMA node 1604 is associated with a second TEPG 1640 that includes two other VTEPs, VTEP3 and VTEP4. In some embodiments, each of the VTEPs 1-4 of each created TEPG 1630 and 1640 is associated with one NUMA node. In such embodiments, no TEP is a member of multiple TEPGs.

The first NUMA node 1602 executes a VM 1635, and the second NUMA node 1604 executes a VM 1645. The NUMA nodes 1602-1604 execute on a same NUMA-based server (i.e., on a same host computer). The first and second NUMA nodes 1602-1604 are part of a first rack 1610 along with two ToR switches 1612-1614. Each of the NICs 1632-1634 connect to each of the ToR switches 1612-1614.

The host computers 1622-1624 respectively include virtual switches 1636-1638, and each host computer 1622-1624 connects to a set of two NICs 1642-1644 and 1646-1648. The first host computer 1622 executes a VM 1652, and the second host computer 1624 executes a VM 1654.

The first and second host computers 1622-1624 are part of a second rack 1660 along with two ToR switches 1662-1664. Each of the NICs 1642-1648 connects to each of the ToR switches 1662-1664. The first rack ToR switches 1612-1614 connect to the second rack ToR switches 1662-1664 through a set spine switches 1672-1676.

The NUMA nodes 1602-1604 and host computers 1622-1624 are configured by a set of one or more controllers 1680. When the virtual switch 1606 generates a machine to VTEP mapping table 1690, the virtual switch 1606 provides it to the controller set 1680. After receiving the table 1690, the controller set 1680 provides it to the host computers 1622-1624 to use to exchange flows with the NUMA nodes 1602-1604.

As shown using dashed arrowed lines, the VM 1635 executing on the first NUMA node 1602 sends Tx flows, which are destined for the VM 1654, to the virtual switch 1606, which encapsulates them with an encapsulating header specifying VTEP1 as its source VTEP and sends them through VTEP1 of the first NIC 1632. In other embodiments, the virtual switch 1606 does not encapsulate flows with the source VTEP.

The NIC 1632 sends the Tx flows to the ToR switch 1614, which sends them to the spine switch 1674. The spine switch 1674 sends the Tx flows to the ToR switch 1664, which sends them to NIC 1646. The NIC 1646 provides the Tx flows to the virtual switch 1638. After receiving the Tx flows, the virtual switch 1638 provides them to the destination VM 1654.

As shown using solid arrowed lines, the VM 1654 sends the Rx flows (which are responsive to the Tx flows, in some embodiments), which are destined for the VM 1635, to the virtual switch 1638. The virtual switch 1638 identifies the destination network address of the Rx flows, which is the network address of the VM 1635. Using the table 1690, the virtual switch 1638 identifies the TEPG associated with the VM 1635 and the VTEPs (VTEP1 and VTEP2) that are members of that TEPG 1630. After identifying these VTEPs, the virtual switch 1638 selects (e.g., using a load balancing operation) one of the VTEPs as the destination VTEP of the Rx flows. In this example, the virtual switch 1638 selects VTEP2.

After selecting the destination VTEP, the virtual switch 1638 encapsulates the Rx flows with an encapsulating header specifying VTEP2, and sends the encapsulated Rx flows to the NIC 1648, which forwards them to the ToR switch 1664. The ToR switch 1664 sends the Rx flows to the spine switch 1676, which sends them to the ToR switch 1614. Then, the ToR switch 1614 sends the Rx flows to VTEP2 of the first NIC 1632, as it is specified in the encapsulating header. Then, the Rx flows are received at the virtual switch 1606, which provides them to the destination VM 1635.

In some embodiments, a machine of a first NUMA node is migrated to a second NUMA node. In such embodiments, the virtual switch of the NUMA nodes generates a new machine to TEPG mapping for the migrating machine, and provides the new mapping to the controller set to provide to other host computers. For example, the VM 1635 in some embodiments is migrated from the first NUMA node 1602 to the second NUMA node 1604. After this migration, the virtual switch 1606 updates the machine's entry in the mapping table 1690 to specify that the machine 1635 is now associated with the second TEPG 1640 that includes VTEPs 3 and 4. After updating the mapping table 1690, the virtual switch 1606 provides the updated mapping table to the controller set 1680, which provides it to the host computers 1622-1624. Alternatively, the virtual switch 1606 just provides the updated mapping entry for the machine 1635 to the controller set 1680, which provides it to the host computers 1622-1624. Now, the virtual switches 1636-1638 can forward flows to the VM 1635 using the correct TEPG 1640.

In some embodiments, as many TEPGs as the number of NUMA nodes uplinks of NICs span are created. For example, if there are four NICs, with two NICs on each NUMA node, two TEPGs of two TEPs each are created. If there are only two NICs that span two NUMA nodes, two TEPGs of one TEP each are created. In other embodiments, if all uplinks of the NICs are associated with one NUMA node, one TEPG including all TEPs is created.

Information regarding which machines execute behind which TEPGs of a NUMA-based server is reported in some embodiments to an SDN controller. When an L2 overlay module of a remote transport node (e.g., a host computer external to the NUMA-based server) wants to send a data message to a machine of the NUMA-based server, the L2 overlay module knows which TEPG behind which the machine executes, so the L2 overlay module chooses to send the data message to one of the TEPs of that TEPG. The L2 overlay module, in doing so, ensures that Rx flows are exchanged through PNICs belonging to the same NUMA node on which the machine is instantiated. For Tx flows, the L2 overlay module chooses one of the members of the TEPG associated with that NUMA node during encapsulation. With this novel solution, flows of workload machines are guaranteed to be exchanged through NICs belonging to the same NUMA executing the workload machines.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
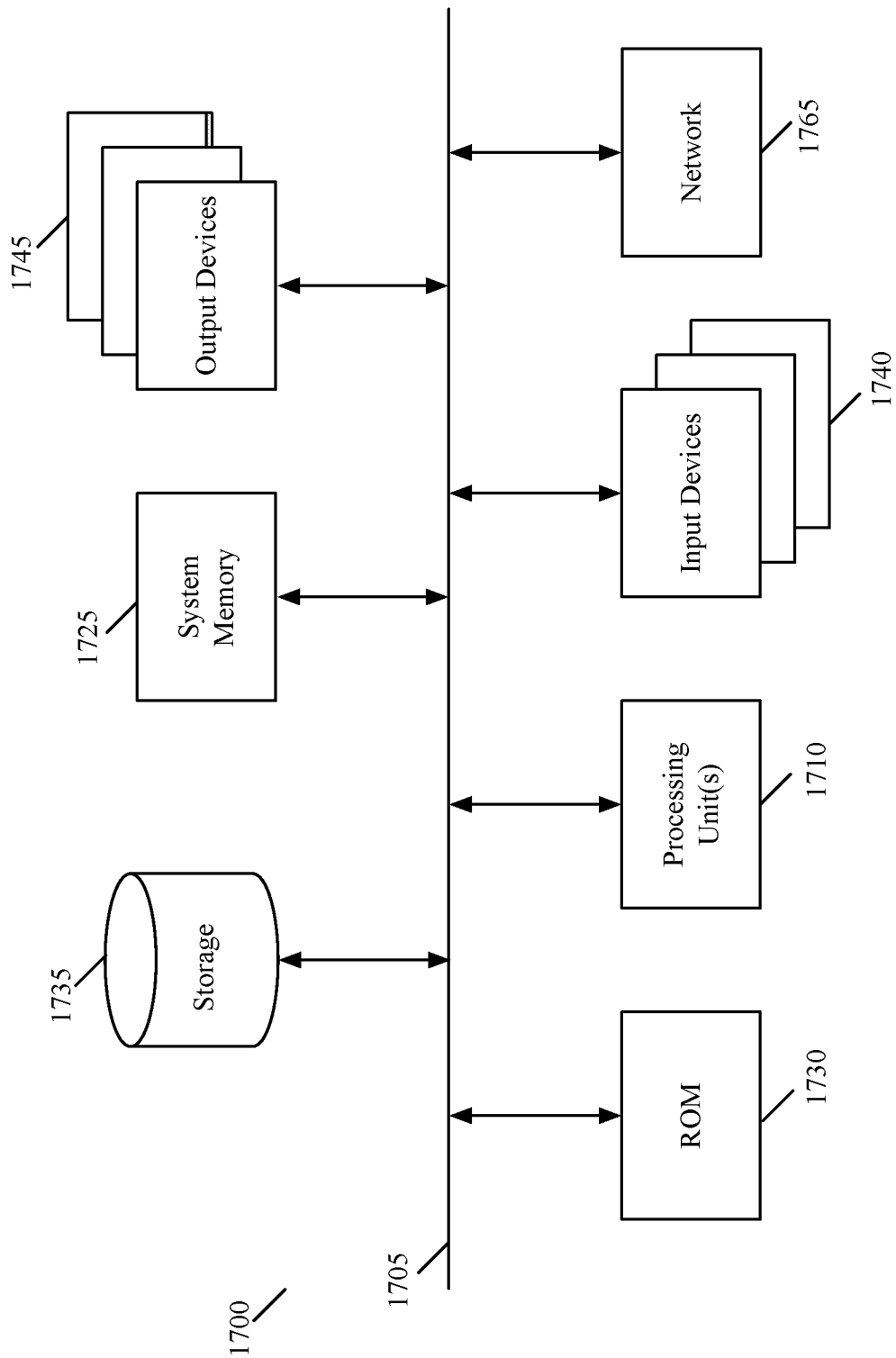
FIG. 17 conceptually illustrates a computer system with which some embodiments of the invention are implemented.

FIG. 17 conceptually illustrates a computer system 1700 with which some embodiments of the invention are implemented. The computer system 1700 can be used to implement any of the above-described computers and servers. As such, it can be used to execute any of the above described processes. This computer system includes various types of non-transitory machine readable media and interfaces for various other types of machine readable media. Computer system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the computer system 1700. For instance, the bus 1705 communicatively connects the processing unit(s) 1710 with the read-only memory 1730, the system memory 1725, and the permanent storage device 1735.

From these various memory units, the processing unit(s) 1710 retrieve instructions to execute and data to process in order to execute the processes of the invention. The processing unit(s) may be a single processor or a multi-core processor in different embodiments. The read-only-memory (ROM) 1730 stores static data and instructions that are needed by the processing unit(s) 1710 and other modules of the computer system. The permanent storage device 1735, on the other hand, is a read-and-write memory device. This device is a non-volatile memory unit that stores instructions and data even when the computer system 1700 is off. Some embodiments of the invention use a mass-storage device (such as a magnetic or optical disk and its corresponding disk drive) as the permanent storage device 1735.

Other embodiments use a removable storage device (such as a flash drive, etc.) as the permanent storage device. Like the permanent storage device 1735, the system memory 1725 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the computer system. The input devices 1740 include alphanumeric keyboards and pointing devices (also called "cursor control devices"). The output devices 1745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples computer system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of computer system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for forwarding data messages between first and second host computers, the method comprising:
   to send, to a first machine executing on the first host computer, a data message flow from a second machine executing on the second host computer:
      identifying a destination network address of the data message flow;
      using the identified destination network address to identify a particular tunnel endpoint group (TEPG) comprising a particular set of one or more tunnel endpoints (TEPs) associated with a particular non-uniform memory access (NUMA) node of a plurality of NUMA nodes of the first host computer, the particular NUMA node executing the first machine;
      selecting, from the particular TEPG, a particular TEP as a destination TEP of the data message flow by identifying one or more mapping entries specifying the particular NUMA node and a plurality of tunnel endpoint identifiers, the particular TEP being selected from the plurality of tunnel endpoint identifiers;
      sending the data message flow to the particular TEP of the particular NUMA node of the first host computer to send the data message flow to the first machine;
      upon detecting a migration of the first machine from a first NUMA node to a second NUMA node, updating the first mapping table to replace the association between the machine's network address and a first TEPG ID with an association between the machine's network address and a second TEPG ID, and providing the updated mapping entry to a controller for distribution to remote host computers.

2. The method of claim 1, wherein identifying the destination network address of the data message flow comprises examining a header of the data message flow to identify the destination network address.

3. The method of claim 2, wherein the destination network address is a media access control (MAC) address of the first machine.

4. The method of claim 1, wherein selecting the particular TEP as the destination TEP of the data message flow comprises performing a load balancing operation to select the particular TEP from the particular set of TEPs of the particular TEPG.

5. The method of claim 1, wherein sending the data message flow to the particular TEP comprises:
encapsulating data messages of the data message flow with an encapsulating header that specifies a particular TEP identifier (ID) identifying the particular TEP; and
sending the encapsulated data messages of the data message flow to the particular TEP.

6. The method of claim 1, wherein using the identified destination network address to identify the particular TEPG comprises performing a lookup operation in a mapping table to match the identified destination network address to a particular mapping entry that specifies the identified destination network address and the particular TEPG.

7. The method of claim 6, wherein the mapping table is received from a set of one or more controllers that configures the first and second host computers.

8. The method of claim 7, wherein a virtual switch of the first host computer generates the mapping table and provides the mapping table to the controller set to provide to the second host computer.

9. The method of claim 6, wherein the first host computer is associated with a plurality of TEPGs.

10. The method of claim 9, wherein each TEPG comprises a different set of TEPs that is associated with a different NUMA node of the first host computer such that each NUMA node is associated with a different TEPG.

11. The method of claim 10, wherein the mapping table comprises a plurality of mapping entries mapping different machines executing on the plurality of NUMA nodes to different TEPGs associated with the plurality of NUMA nodes.

12. The method of claim 10, wherein each TEP of each TEPG is associated with one NUMA node.

13. The method of claim 10, wherein each NUMA node of the first host computer comprises a local memory and a set of processors that can provide data message flows destined to other NUMA nodes to the other NUMA nodes.

14. The method of claim 10, wherein each NUMA node of the first host computer comprises a local memory and a set of processors that can access data from local memories of other NUMA nodes.

15. The method of claim 10, wherein each NUMA node is connected to a different set of one or more physical network interface cards (PNICs) to connect to the second host computer.

16. The method of claim 15, wherein each TEP of each NUMA node is associated with the set of PNICs connected to the NUMA node.

17. The method of claim 15, wherein each PNIC connects to the second host computer through one or more Top-of-Rack (ToR) switches.

18. The method of claim 1, wherein the identifying, using, selecting, and sending are performed by a virtual switch of the second host computer.

19. The method of claim 1, wherein the first and second machines are first and second virtual machines (VMs).

20. A non-transitory machine readable medium storing a program for execution by at least one processing unit for forwarding data messages between first and second host computers, the program comprising sets of instructions for:
to send, to a first machine executing on the first host computer, a data message flow from a second machine executing on the second host computer:
identifying a destination network address of the data message flow;
using the identified destination network address to identify a particular tunnel endpoint group (TEPG) comprising a particular set of one or more tunnel endpoints (TEPs) associated with a particular non-uniform memory access (NUMA) node of a plurality of NUMA nodes of the first host computer, the particular NUMA node executing the first machine;
selecting, from the particular TEPG, a particular TEP as a destination TEP of the data message flow by identifying one or more mapping entries specifying the particular NUMA node and a plurality of tunnel endpoint identifiers, the particular TEP being selected from the plurality of tunnel endpoint identifiers;
sending the data message flow to the particular TEP of the particular NUMA node of the first host computer to send the data message flow to the first machine;
upon detecting a migration of the first machine from a first NUMA node to a second NUMA node, updating the first mapping table to replace the association between the machine's network address and a first TEPG ID with an association between the machine's network address and a second TEPG ID, and
providing the updated mapping entry to a controller for distribution to remote host computers.

* * * * *